(12) United States Patent
Shinya

(10) Patent No.: US 8,271,002 B2
(45) Date of Patent: Sep. 18, 2012

(54) E-MAIL DISTRIBUTION SYSTEM, AND E-MAIL DISTRIBUTION METHOD

(75) Inventor: Tadashi Shinya, Tokyo (JP)

(73) Assignee: Vodafone Group PLC, Newbury, Berkshire (GB)

( * ) Notice: Subject to any disclaimer, the term of this patent is extended or adjusted under 35 U.S.C. 154(b) by 697 days.

(21) Appl. No.: 11/573,342

(22) PCT Filed: Oct. 18, 2005

(86) PCT No.: PCT/JP2005/019103
§ 371 (c)(1),
(2), (4) Date: Feb. 6, 2007

(87) PCT Pub. No.: WO2006/046439
PCT Pub. Date: May 4, 2006

(65) Prior Publication Data
US 2008/0233923 A1    Sep. 25, 2008

(30) Foreign Application Priority Data
Oct. 26, 2004    (JP) ................................. 2004-310635

(51) Int. Cl.
*H04W 4/00*    (2009.01)

(52) U.S. Cl. .................. 455/466; 455/412.1; 455/414.1; 709/206; 370/310; 370/310.2; 370/328

(58) Field of Classification Search .............. 455/412.1, 455/414.1; 709/206; 370/310, 310.2, 328
See application file for complete search history.

(56) References Cited

U.S. PATENT DOCUMENTS

| 6,421,709 B1 | 7/2002 | McCormick et al. | |
|---|---|---|---|
| 7,024,199 B1 * | 4/2006 | Massie et al. ................. | 455/445 |
| 7,373,654 B1 * | 5/2008 | Reid ................................. | 726/1 |
| 7,406,502 B1 * | 7/2008 | Oliver et al. ................... | 709/206 |
| 7,422,115 B2 * | 9/2008 | Zager et al. .................... | 209/206 |
| 2002/0052921 A1 * | 5/2002 | Morkel .......................... | 709/206 |
| 2003/0023692 A1 | 1/2003 | Moroo | |
| 2003/0032409 A1 * | 2/2003 | Hutcheson et al. ........... | 455/414 |
| 2003/0054810 A1 * | 3/2003 | Chen et al. ..................... | 455/422 |
| 2003/0095550 A1 * | 5/2003 | Lewis et al. .................... | 370/392 |
| 2003/0095555 A1 * | 5/2003 | McNamara et al. .......... | 370/401 |
| 2003/0096600 A1 * | 5/2003 | Lewis et al. .................... | 455/412 |
| 2003/0096605 A1 * | 5/2003 | Schlieben et al. ............. | 455/419 |

(Continued)

FOREIGN PATENT DOCUMENTS

EP    1 179 950 A2    2/2002

(Continued)

*Primary Examiner* — Nimesh Patel
(74) *Attorney, Agent, or Firm* — Muirhead and Saturnelli, LLC

(57) ABSTRACT

A method and device capable of automating registration of a transmission mail address allowed for reception in a white list and reducing a user burden without an input error is provided. From a mobile unit, in respect of registration of a transmission address allowed for reception in a white list of an e-mail server, it becomes possible to eliminate a work of making an operation of inputting list data for updating the white list by utilizing information electronically stored in an address directory, and further, it becomes possible to reliably register the latest data free of an input error as a white list. In addition, the data stored in the white list of the e-mail server is transferred to a mobile terminal device, thereby making it easy to update an address directory due to a device model change.

25 Claims, 13 Drawing Sheets

U.S. PATENT DOCUMENTS

| | | | |
|---|---|---|---|
| 2003/0153302 A1* | 8/2003 | Lewis et al. | 455/412 |
| 2003/0159054 A1* | 8/2003 | Fauble et al. | 713/189 |
| 2003/0236847 A1* | 12/2003 | Benowitz et al. | 709/206 |
| 2004/0111480 A1* | 6/2004 | Yue | 709/206 |
| 2004/0148573 A1* | 7/2004 | Buice et al. | 715/517 |
| 2004/0249895 A1* | 12/2004 | Way | 709/206 |
| 2005/0033810 A1* | 2/2005 | Malcolm | 709/206 |
| 2005/0102381 A1* | 5/2005 | Jiang et al. | 709/220 |
| 2005/0182735 A1* | 8/2005 | Zager et al. | 705/67 |
| 2005/0198145 A1* | 9/2005 | Davis | 709/206 |
| 2005/0198174 A1* | 9/2005 | Loder et al. | 709/206 |
| 2006/0021031 A1* | 1/2006 | Leahy et al. | 726/22 |
| 2006/0026246 A1* | 2/2006 | Fukuhara et al. | 709/206 |
| 2006/0047766 A1* | 3/2006 | Spadea, III | 709/206 |
| 2006/0053203 A1* | 3/2006 | Mijatovic | 709/206 |
| 2006/0085341 A1* | 4/2006 | Grim et al. | 705/50 |
| 2006/0224526 A1* | 10/2006 | Klug | 705/410 |
| 2007/0038771 A1* | 2/2007 | Julia et al. | 709/231 |
| 2007/0206758 A1* | 9/2007 | Barak | 379/202.01 |
| 2008/0227473 A1* | 9/2008 | Haney | 455/457 |
| 2008/0306959 A1* | 12/2008 | Spivack et al. | 707/9 |
| 2009/0157888 A1* | 6/2009 | Demmer et al. | 709/229 |
| 2009/0319290 A1* | 12/2009 | Loder et al. | 705/1 |

FOREIGN PATENT DOCUMENTS

| | | |
|---|---|---|
| EP | 1357764 A1 | 10/2003 |
| JP | 2003-141043 A | 5/2003 |
| JP | 2005-250789 A | 9/2005 |
| WO | WO 99/37066 | 7/1999 |
| WO | WO 02/19120 A1 | 3/2002 |

\* cited by examiner

E-MAIL DISTRIBUTION SYSTEM, AND E-MAIL DISTRIBUTION METHOD This application is the U.S. National Phase under 35 U.S.C. §371 of International Application PCT/JP2005/019103, filed on Oct. 18, 2005, which claims priority to Japanese Patent Application No. 2004-310635, filed on Oct. 26, 2004, the contents of which are all herein incorporated by this reference in their entireties. The International Application was published under PCT Article 21(2) in a language other than English. All publications, patents, patent applications, databases and other references cited in this application, all related applications referenced herein, and all references cited therein, are incorporated by reference in their entirety as if restated here in full and as if each individual publication, patent, patent application, database or other reference were specifically and individually indicated to be incorporated by reference.

TECHNICAL FIELD

The present invention relates to an electronic mail management method and an electronic mail management device such as avoiding reception of an unsolicited bulk e-mail. In particular, the present invention relates to a system of distributing an electronic mail transmitted to a mobile terminal and an electronic mail system.

BACKGROUND ART

In electronic mails at a mobile terminal, there exist a number of unsolicited bulk e-mails (Spam mail) intentionally continuously sent to a receiver, although the receiver does not want to receive. In view of the characteristics of the mobile terminal, a data transfer rate is low, and communication cost is higher, and thus, the receiver's time-based and cost-based inconveniences become high. As one of countermeasures for rejecting such an unsolicited bulk e-mail, a white list having listed up transmitters for permitting mail reception every receiver's mobile unit is provided at a server, and it has been practiced to distribute an electronic mail to the receiver's mobile unit by using this list.

In this method, a white list is provided at an e-mail server in association with each receiver's mobile unit; a transmission mail address allowed for reception of an e-mail specified by the receiver's mobile unit is inputted via a communication line; and then, the inputted address is registered in the white list that corresponds to the receiver's mobile unit. The mail server compares a transmission source mail address of an e-mail transmitted to the receiver's mobile unit with a reception allowable mail address received in the white list that corresponds to the receiver's mobile unit. As a result of the comparison, only the e-mail whose transmission source mail address has been judged as being registered in the white list is distributed to the receiver's mobile unit. As a result, the receiver's mobile unit can receive only the e-mail desired by a user of this receiver's mobile unit. In this manner, it becomes possible to reject reception of an unsolicited bulk e-mail that the receiver does not want to receive.

The technical documents relating to the unsolicited bulk e-mails exist as follows.

Patent document 1: JP 2001-298522 A

Patent document 2: JP 2003-46576 A

Patent document 3: JP 2003-150512 A

DISCLOSURE OF THE INVENTION

Problem that the Invention is Intended to Solve

In order to register a transmission mail address allowed for reception in a white list of an e-mail server, it is necessary for a user of a receiver's mobile unit to use input means provided at this mobile unit, thereby manually inputting the e-mail address allowed for transmission, and then, transmitting the inputted address to the server. Therefore, a long period of time and much effort is required for input, and there is a problem that an input error occurs or the like. The present invention provides a system, method, and device capable of reducing a user's burden without an input error by automating registration of a transmission mail address allowed for reception in the white list.

Means for Solving the Problem

A mobile unit has a feature of electrically storing an e-mail address when an e-mail has been transmitted previously from the mobile unit or when there is a possibility of transmitting an e-mail as a telephone directory or an e-mail address directory (hereinafter, referred to as an "address directory"). Uses of the e-mail addresses stored in these address directories are unique partners for the users of the mobile units, and it is conceivable that the e-mails from the e-mail addresses stored in the address directories do not generally fall into unsolicited bulk e-mails for the users of the mobile units. Therefore, it becomes possible to utilize the e-mail addresses stored in the address directories of the mobile units as data contained in the white list of the e-mail server.

Effect of the Invention

A mail server according to the present invention has a feature of receiving from a mobile unit via a communication line an e-mail address stored in an address directory of that mobile unit, and then, registering the received mail address in a white list that corresponds to a receiver unit. The number or registration contents of the e-mail addresses registered in the address directory change monthly and daily. Therefore, it is desirable that the contents of the address directory in the mobile unit should coincide with those registered in the white list of the e-mail server. Accordingly, in the present invention, it is also possible to provide means for registering the contents of the address directory in the white list in accordance with the user's instruction of the mobile unit and means for, when an address directory has been changed or at a predetermined timing automatically transmitting the contents of the address directory to the e-mail server, and then, registering the transmitted contents to the white list of the e-mail server.

With introduction of a USIM ("Universal Subscriber Identity Module") card, it becomes possible to easily exchange a mobile unit with another one, whereby it is presumed that there is higher frequency of transferring the contents of the telephone directory stored in an old mobile unit to a new mobile unit. Therefore, at the time of registration of the white list, the receiver's mobile unit transmits telephone numbers and any other contents to the server as well as the e-mail addresses of the transmitter's device, and the server stores the contents of these items of data, whereby the user of the receiver's mobile unit can receives from the server the contents identical to those of the telephone directory of the old mobile unit, and then, transfer the received contents to the telephone directory of the new mobile unit.

BEST MODE FOR CARRYING OUT THE INVENTION

Figure 1:
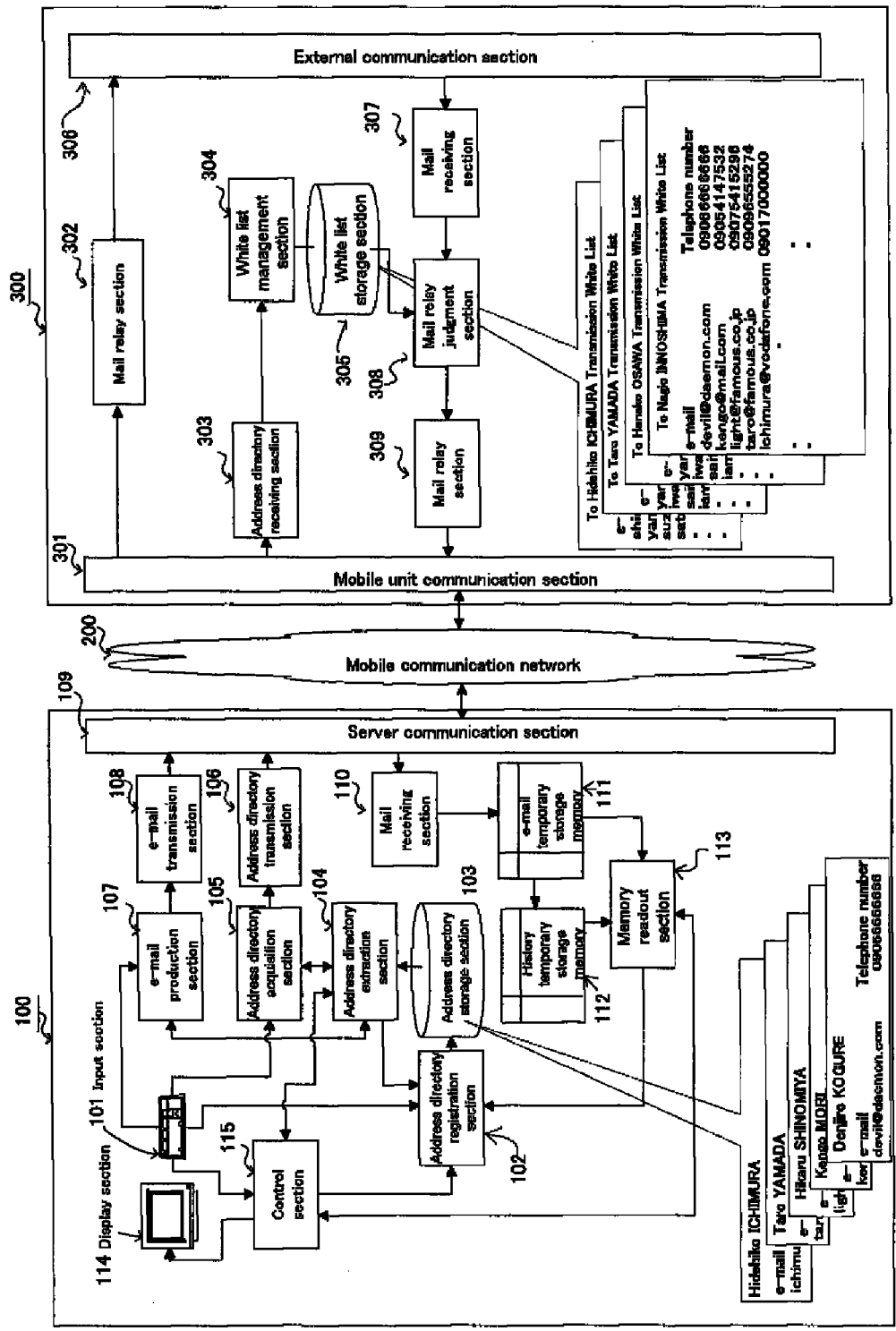
FIG. 1 is a block diagram of a first embodiment of the present invention.

FIG. 1 is a block diagram depicting a configuration of a communication system including a mobile communication terminal device (mobile unit) and a server device according to a first embodiment of the present invention.

A mobile communication terminal device 100 makes wireless communication with a server device 300 via a communication network 200 including a mobile communication network and a public network. A mobile communication terminal device (not shown) other than the mobile communication terminal device 100 can also make communication with a server device 300 via the communication network 200. The server device 300 is connected to another server device or an exchange unit via another communication network (not shown).

There are three main methods for registering information such as an e-mail address in an address directory of the mobile communication terminal device 100 according to the present invention, as set firth below.

A first registration method is a method for a user to operate an input section 101 of the mobile communication terminal device 100 to newly register address directory information on a communication partner in an address directory storage section 103.

A second registration method is a method for a user to operate an input section 101 to change address information that has been already registered in an address directory, and then, updating and registering address directory information on a communication partner in an address directory storage section 103.

A third registration method is a method for extracting required information such as an electronic mail address of a transmitter of an electronic mail from the electronic mails that the mobile communication terminal device 100 has received, and then, newly registering the extracted information in the address directory storage section 103.

First Registration Method

Figure 2:
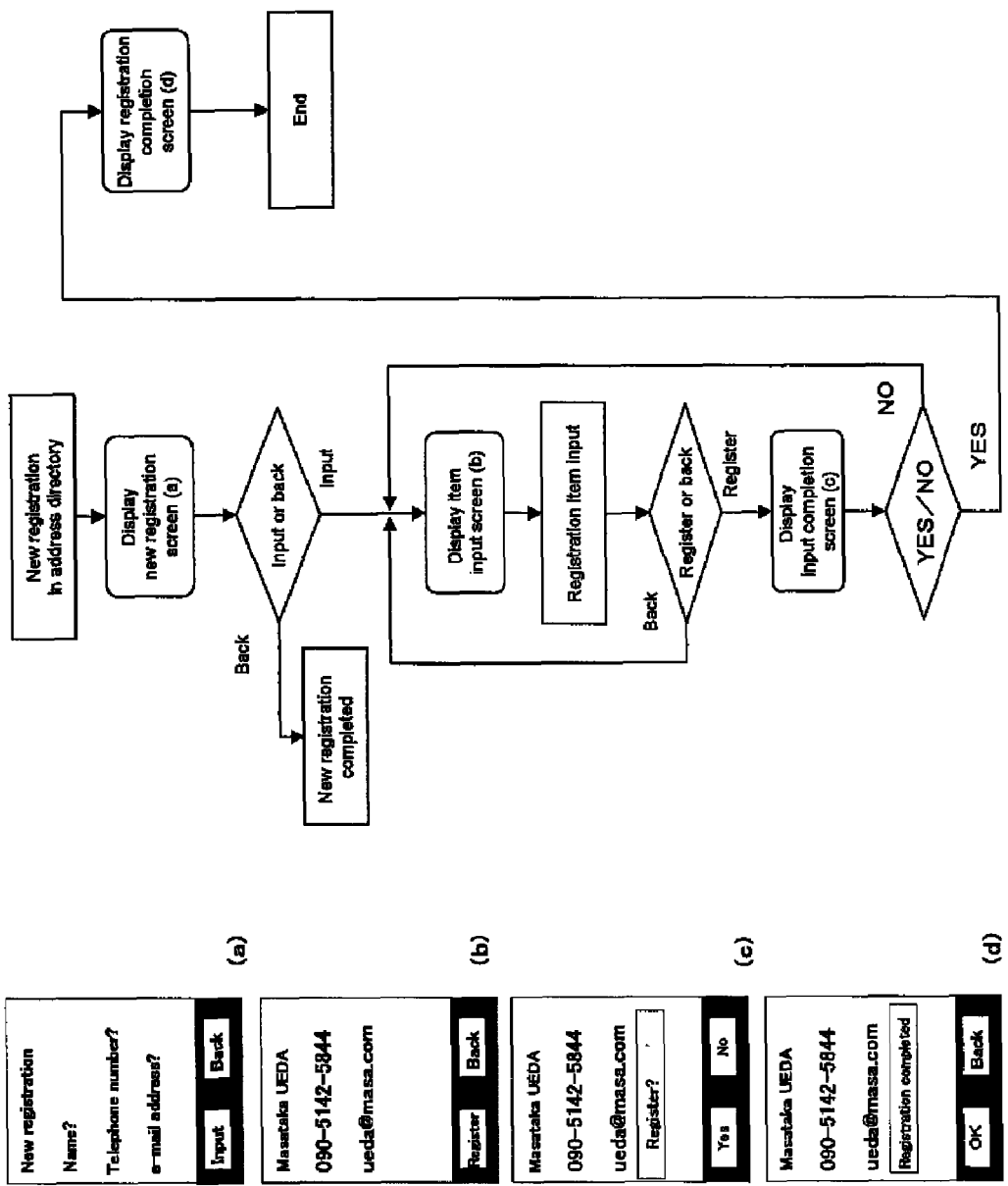
FIG. 2 is a diagram showing a first registration mode of an address directory of a mobile communication terminal device according to the present invention.
Figure 3:
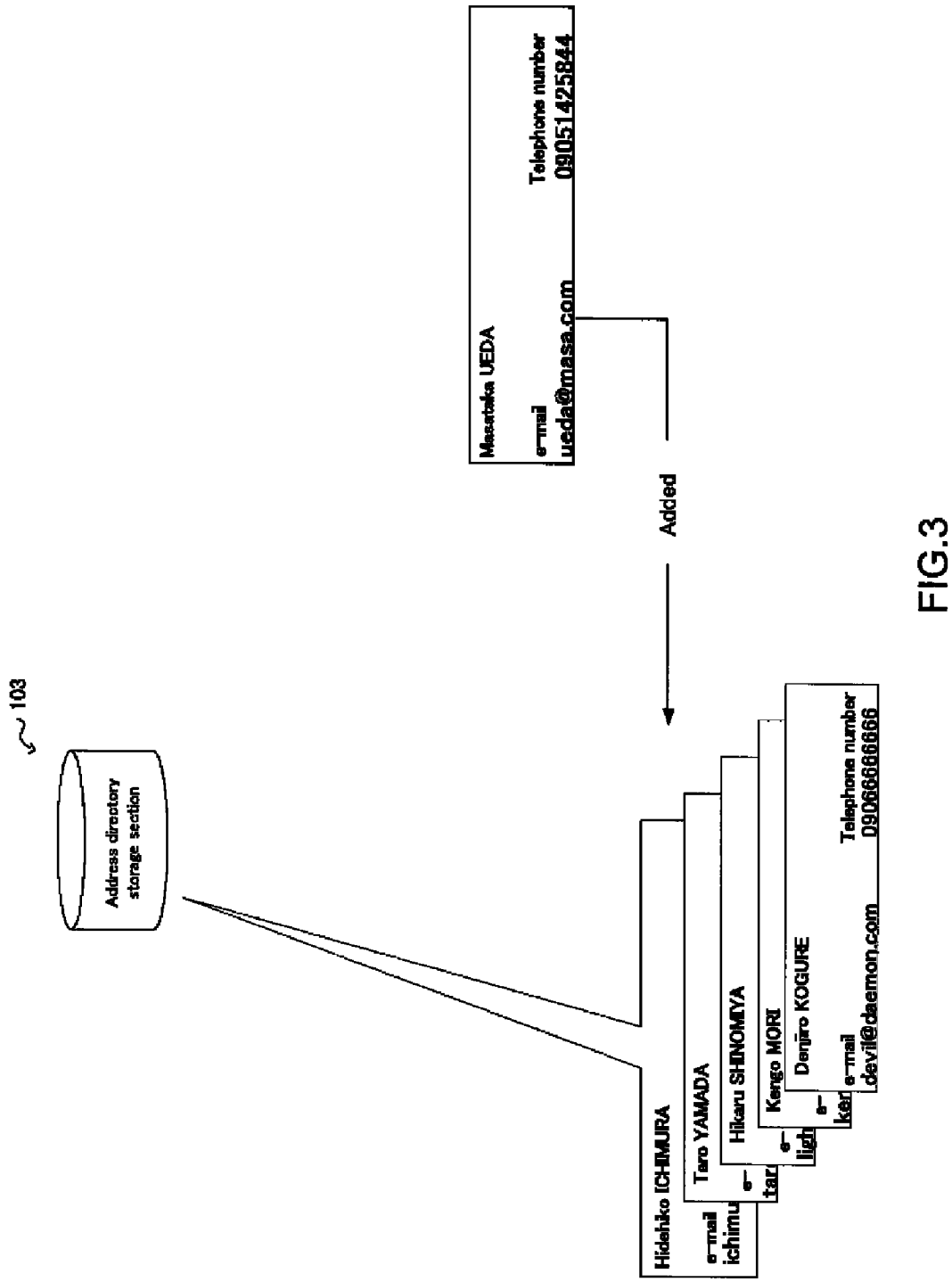
FIG. 3 is a diagram showing a change of the address directory in the first registration mode of the address directory.

A first registration method will be described with reference to FIG. 2 and FIG. 3 in addition to FIG. 1. FIG. 2 is a schematic diagram depicting a specific example of information displayed at a display section 114 when executing the first registration method in a mobile communication terminal device according to a first embodiment of the present invention. FIG. 3 is a schematic diagram schematically depicting a specific example of address directory information stored in an address directory storage section 103 in the mobile communication terminal device according to the first embodiment of the present invention.

A user makes a predetermined operation using buttons provided at this mobile communication terminal device 100 in the case where of desiring new registration of address directory information. In this manner, an input section 101 outputs operational information indicating new registration of address directory information to a control section 115.

The display section 114 having received control of the control section 115, as shown in FIG. 2(a), displays: information "new registration" indicating that new registration of address directory information is being executed; information "name?" indicating that an request is made to enter a name of a communication partner targeted for registration; information "telephone number?" indicating that a request is made to enter a telephone number of a communication partner targeted for registration; and information "e-mail address?" indicating that a request is made to enter an electronic mail address of a communication partner targeted for registration.

In a state in which the display shown in FIG. 2(a) is made by the display section 114, in the case where a user has depressed a button that corresponds to "back", the input section 101 outputs the operational information indicating the fact to the control section 115. In this manner, the display section 114 having received control of the control section 115 displays the fact that a new registration operation of address directory information has been canceled.

Conversely, in the case where the user has depressed a button that corresponds to "input", the input section 101 outputs operational information indicating the fact to the control section 115. The control section 115 acquires and maintains from the input section 101 the operational information that corresponds to the user's button operation (that is, operational information that corresponds to a name, a telephone number, and an electronic mail address of a communication partner targeted for registration). The display section 114 having received control of the control unit 115, as shown in FIG. 2(b), displays a name, a telephone number, and an electronic mail address of a communication partner targeted for registration.

In a state in which the display shown in FIG. 2(b) is made by the display section 114, in the case where the user has depressed a button that corresponds to "back", the input section 101 outputs the operational information indicating the fact to the control section 115. The display section 114 having received control of the control section 115 displays the information shown in FIG. 2(a) again.

Conversely, in the case where the user has depressed a button that corresponds to "register", the input section 101 outputs the operational information indicating the fact to the control section 115. The display section 114 having received control of the control section 115 makes a display "registration?" which asks whether or not to make registration, as shown in FIG. 2(c).

In a state in which the display shown in FIG. 2(c) is made by the display section 114, in the case where the user has depressed a button that corresponds to "No", the input section 101 outputs the operational information indicating the fact to the control section 115. The display section 114 having received control of the control section 115 displays the information shown in FIG. 2(b) again.

Conversely, in the case where the user has depressed a button that corresponds to "Yes", the input section 101 outputs the information indicating the fact to the control section 115. The display section 114 having received control of the control section 115, as shown in FIG. 2(d), makes a display "registration completed" indicating that registration has been executed. After this display or before this display, the control section 115 outputs to an address directory registration section 102 the operational information acquired and maintained from the input section 101, i.e., the operational information that corresponds to a name, a telephone number, and an electronic mail address of a communication partner targeted for registration. The address registration section 102, as shown in FIG. 3, uses the operational information acquired from the control section 115 to register a telephone number "090-5142-5844" and an e-mail address "ueda@masa.com" as address directory information relating to a communication partner "Masataka UEDA" into the address directory storage section 103.

Second Registration Method

Figure 4:
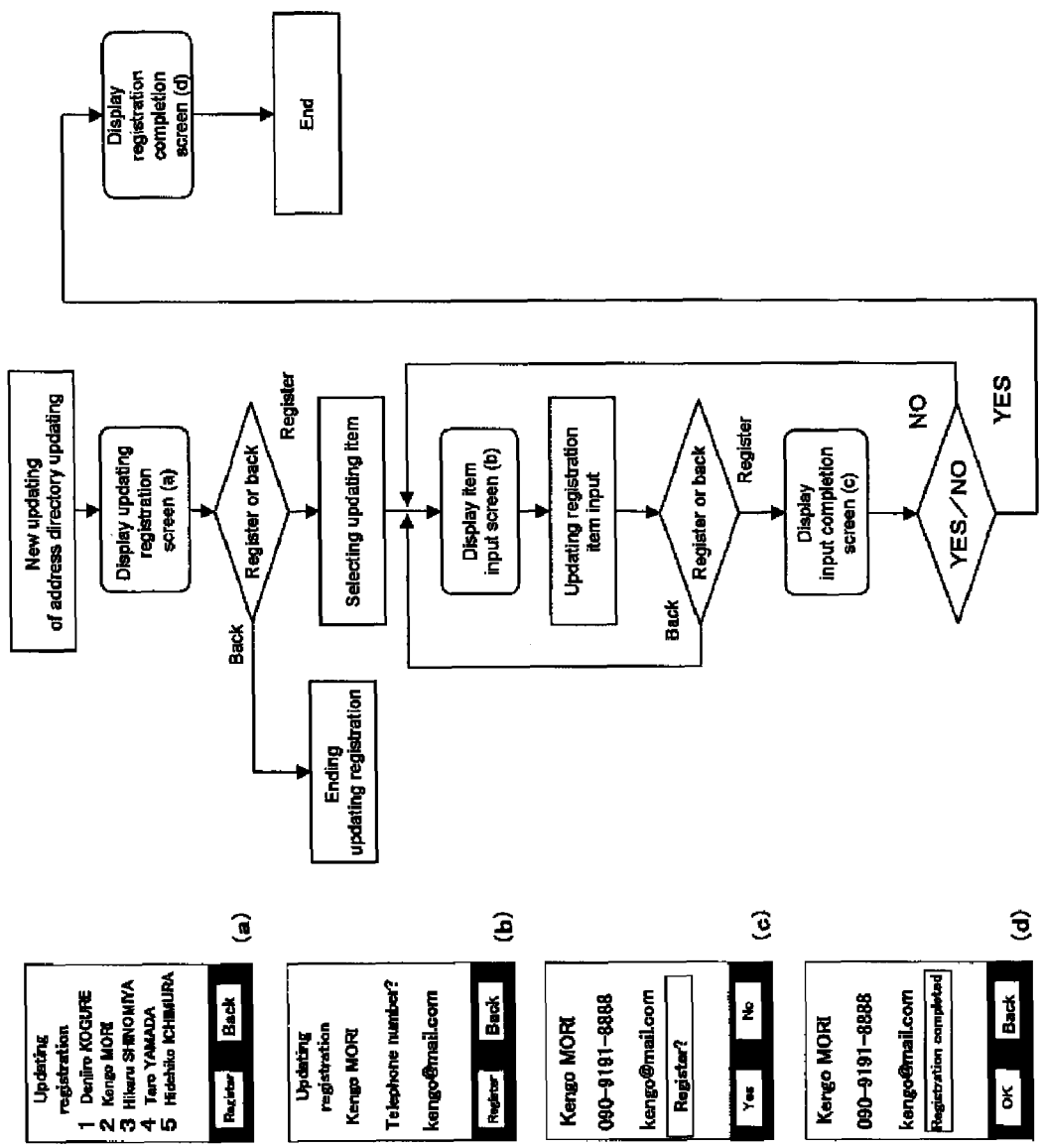
FIG. 4 is a diagram showing a second registration mode of an address directory of a mobile communication terminal device according to the present invention.
Figure 5:
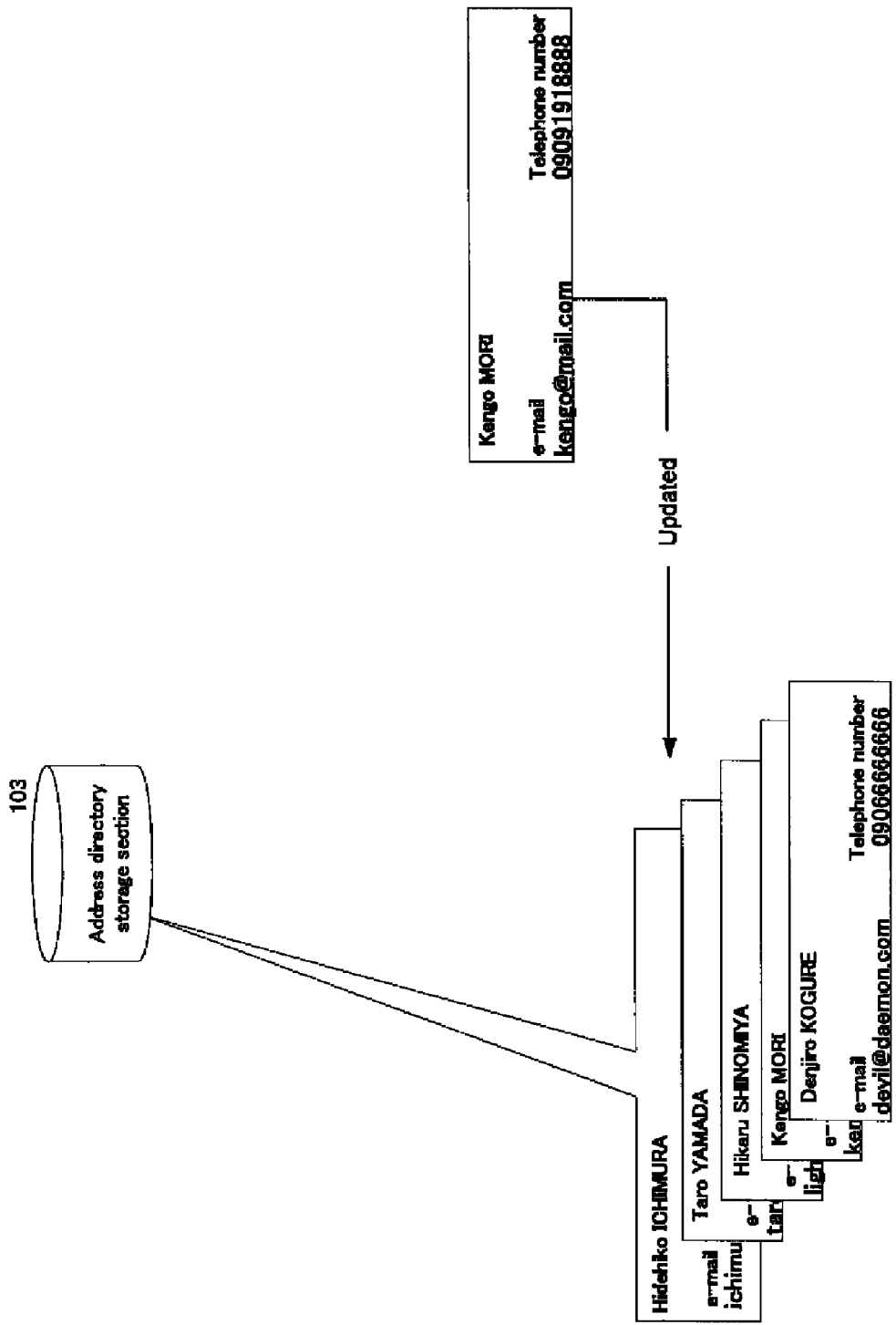
FIG. 5 is a view showing a change of the address directory in the second registration mode of the address directory.

A second registration method will be described with reference to FIG. 4 and FIG. 5 in addition to FIG. 1. FIG. 4 is a schematic diagram depicting a specific example of information displayed at a display section 114 when executing the second registration method in the mobile communication terminal device according to the first embodiment of the present invention. FIG. 5 is a schematic diagram schematically depicting a specific example of address directory information stored in an address directory storage section 103 in the mobile communication terminal device according to the first embodiment of the present invention.

A user makes a predetermined operation using buttons provided at this mobile communication terminal device 100 in the case of desiring updating registration of address directory information. In this manner, an input section 101 outputs operational information indicating updating registration of address directory information to a control section 115 and an address directory acquisition section 105.

The address directory acquisition section 105 having received operational information indicating updating registration of address directory information outputs a signal indicating that a request is made to read out address directory information to the address directory readout section 104. The address directory readout section 104 having received this signal reads out address directory information relating to all the communication partners (five persons "Denjiro KOGURE", "Kengo MORI", Hikaru SHINOMIYA", "Taro YAMADA", and "Hidehiko ICHIMURA", as shown in FIG. 1) maintained by an address directory storage section 103, and then, outputs the read out information to the control section 115.

The control section 115 maintains the address directory information received from the address directory readout section 104. A display section 114 having received control of the control section 115, as shown in FIG. 4(a), displays: information "updating registration" indicating that updating registration of address directory information is being executed; and a name of a communication partner and a number corresponding to the name from among the address directory information stored in the address directory storage section 103.

In a state in which the display shown in FIG. 4(a) is made by the display section 114, in the case where a user has depressed a button that corresponds to "back", the input section 101 outputs the operational information indicating the fact to the control section 115. In this manner, the display section 114 having received control of the control section 115 displays the fact that an updating registration operation of address directory information has been canceled.

Conversely, in the case where the user has depressed a button that corresponds to "register" and has depressed a button corresponding to a number that corresponds to a communication partner targeted for updating registration (any of numbers "1" to "5" shown in FIG. 4(a). Here, the user depresses a button that corresponds to number "2" equivalent to "Kengo MORI", the input section 101 outputs the operational information indicating the fact to the control section 115.

The control section 115 maintains only address directory information relating to a communication partner ("Kengo MORI") specified from the operational information received from the input section 101 (operational information that corresponds to a number equivalent to "Kengo MORI") among the address directory information relating to all the communication partners maintained as described above.

The display section 114 having received control of the control section 115, as shown in FIG. 4(b), displays address directory information relating to a communication partner "Kengo MORI". Here, the address directory information relating to the communication partner "Kengo MORI" include only the name and electronic mail address, and does not include the telephone number. Therefore, the display section 114 having received control of the control section 115, as shown in FIG. 4(b), displays information "telephone number?" indicating that a request is made to enter a telephone number.

In a state in which the display shown in FIG. 4(b) is made by the display section 114, in the case where the user has depressed a button that corresponds to "back", the input section 101 outputs the operational information indicating the fact to the control section 115. In this manner, the display section 114 having received control of the control section 115 makes the display shown in FIG. 4(a) again.

Conversely, in the case where the user has depressed a button that corresponds to "register" (i.e., in the cased where the user has expressed one's intention to enter a telephone number), the input section 101 outputs the operational information indicating the fact to the control section 115. The control section 115 acquires from the input section 101 the operational information that corresponds to the user's button operation (i.e., operational information that corresponds to a telephone number of a communication partner (Kengo MORI" targeted for registration), and then, maintains the acquired information. The display section 114 having received control of the control section 115, as shown in FIG. 4(c), displays a name, a telephone number, and an electronic mail address of a communication partner targeted for registration and makes a display "registration?" asking whether or not to register the thus displayed name, telephone number, and electronic mail address as address directory information relating to "Kengo MORI" targeted for registration.

In a state in which the display shown in FIG. 4(c) is made by the display section 114, in the case where a user has depressed a button that corresponds to "No", the input section 101 outputs the operational information indicating the fact to the control section 115. The display section 114 having received control of the control section 115 displays the information shown in FIG. 4(*b*) again.

Conversely, in the case where the user has depressed a button that corresponds to "Yes", the input section 101 outputs the information indicating the fact to the control section 115. The display section 114 having received control of the control section 115, as shown in FIG. 4(*d*), makes a display "registration completed" indicating that updating registration has been executed. After this display or before this display, the control section 115 outputs to an address directory registration section 102 as new address directory information relating to a communication partner "Kengo MORI" the operational information acquired from the input section 101 and maintained therein, i.e., a telephone number of "Kengo MORI" targeted for registration; and the name and electronic mail address of "Kengo MORI" targeted for registration, the name and e-mail address being received from the address directory readout section 104 and maintained therein.

The address directory registration section 102, as shown in FIG. 5, registers a telephone number "090-9191-8888" and an electronic mail address "kengo@mail.com" as address directory information relating to a communication partner "Kengo MORI" in the address directory storage section 103.

Third Registration Method

Figure 6:
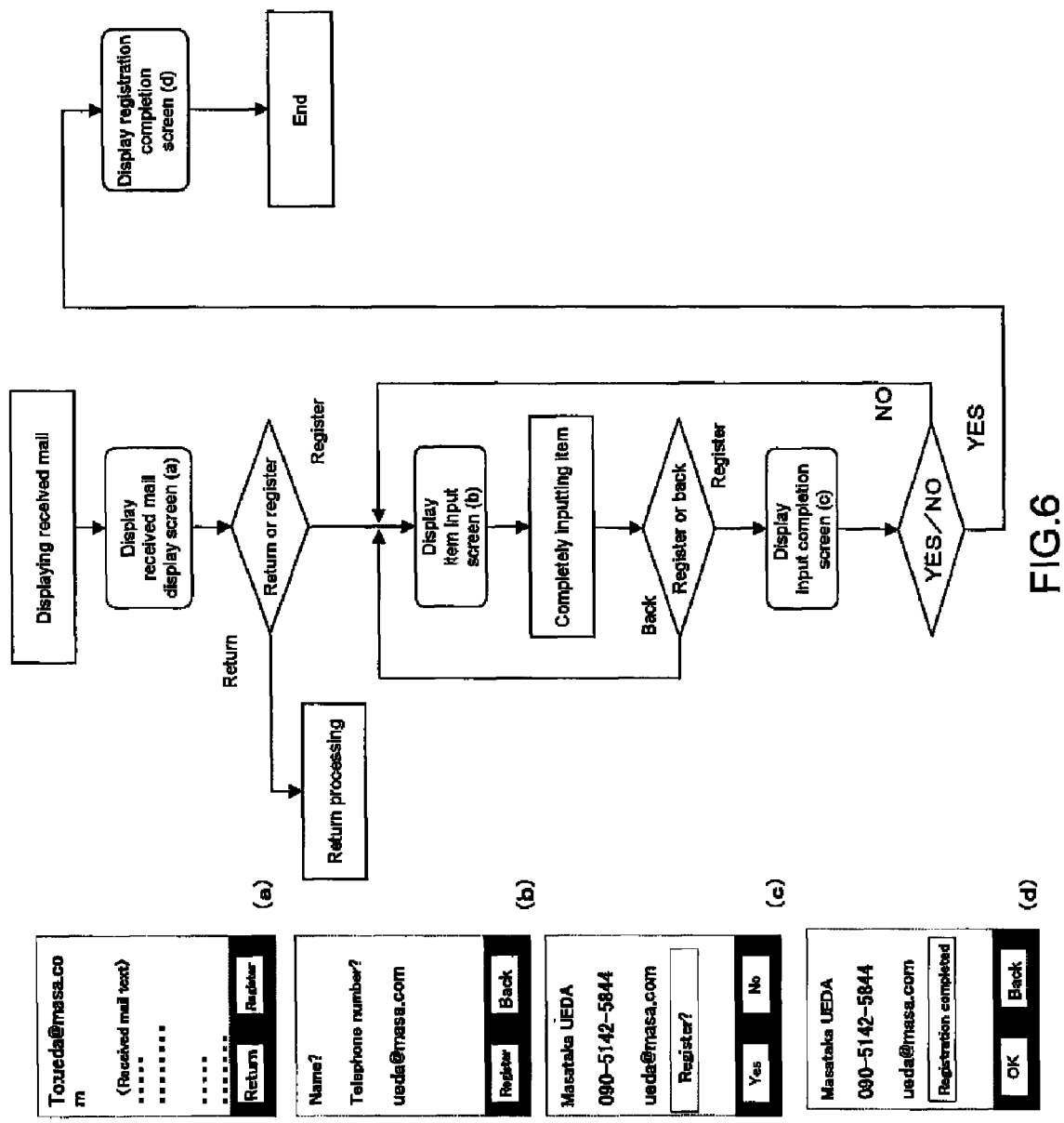
FIG. 6 is a diagram showing a third registration mode of an address directory of a mobile communication terminal device according to the present invention.

A third registration method will be described with reference to FIG. 6 in addition to FIG. 1. FIG. 6 is a schematic diagram depicting a specific example of information displayed at a display section when executing the third registration method in the mobile communication terminal device according to the first embodiment of the present invention.

With reference to FIG. 1, the electronic mail transmitted to a user of a mobile communication terminal device 100 is received by a server communication section 109 of the mobile communication terminal device 100 via a communication network 200. This electronic mail is subjected to a receiving processing operation such as a frequency conversion processing operation or a demodulation processing operation by means of the server communication section 109. These electronic mails applied with the receiving processing operation are decoded by means of a mail receiving section 110, whereby electronic mail data (including an e-mail text, a title, and a transmitter's electronic mail address) is extracted. The extracted electronic mail data is stored in an e-mail temporary storage memory 111.

In a state in which the electronic mail data is stored in the e-mail temporary storage memory 111, a user makes a predetermined operation using buttons provided at this mobile communication terminal device 100 in the case where reference is made to the electronic mail data. The control section 115 having received from the input section 101 the operational information that corresponds to this operation outputs to a memory readout section 113 a signal indicating the fact that electronic mail data is read out from the e-mail temporary storage memory 111. The memory readout section 113 having received this signal reads out the specified electronic mail data from the e-mail temporary storage memory 111, and then, outputs the read out data to the control section 115 and the address directory registration section 102. The address directory registration section 102 maintains a transmitter's electronic mail address among the electronic mail data from the memory readout section 113.

The display section 114 having received control of the control section 115, as shown in FIG. 6(*a*), displays electronic mail data from the memory readout section 113. Here, the display section 114 displays: the electronic mail address of "Masataka UEDA" that is a transmitter of this mail; and the e-mail text, by using the electronic mail data from the memory readout section 113.

In this state, in the case where the user has depressed a button that corresponds to "register" in order to register a communication partner "Masataka UEDA" as address directory information as a communication partner, the input section 101 outputs the operational information indicating the fact to the control section 115. In this manner, the display section 114 having received control of the control section 115, as shown in FIG. 6(*b*), uses the electronic mail data from the memory readout section 113 to display the electronic mail address of "Masataka UEDA" that is a transmitter of this mail and to display information "name?" indicating that a request is made to enter a communication partner targeted for registration, i.e., the name of "Masdataka UEDA"; and information "telephone number?" indicating the fact that a request is made to enter the telephone number of "Masataka UEDA".

In a state in which the display shown in FIG. 6(*b*) is made by the display section 114, in the case where the user has depressed a button that corresponds to "back", the input section 101 outputs the operational information indicating the fact to the control section 115. In this manner, the display section 114 having received control of the control section 115 makes the display shown in FIG. 6(*a*) again.

Conversely, in the case where the user has depressed a button that corresponds to "register", the input section 101 outputs the operational information indicating the fact to the control section 115. The control section 115 acquires from the input section 101 the operational information that corresponds to the user's button operation (that is, operational information corresponding to the name and telephone number of the communication partner "Masataka UEDA" targeted for registration) and maintains the acquired information. The display section 114 having received control of the control section 115, as shown in FIG. 6(*c*), displays the name, telephone number, and electronic mail address of the communication partner "Masataka UEDA" targeted for registration and makes a display "registration?" asking whether or not to register the thus displayed name, telephone number, and electronic mail address as address directory information relating to "Masataka UEDA" targeted for registration.

In a state in which the display shown in FIG. 6(*c*) is made by the display section 114, in the case where the user has depressed a button that corresponds to "No", the input section 101 outputs the operational information indicating the fact to the control section 115. The display section 114 having received control of the control section 115 displays the information shown in FIG. 6(*c*) again.

Conversely, in the case where the user has depressed a button that corresponds to "Yes", the input section 101 outputs the information indicating the fact to the control section 115. The display section 114 having received control of the control section 115, as shown in FIG. 6(*d*), makes a display "registration completed" indicating that address directory information relating to "Masataka UEDA" targeted for registration has been registered. After this display or before this display, the control section 115 outputs to the address directory registration section 102 the operational information acquired from the input section 101 and maintained therein, i.e., the name and telephone number of "Masataka UEDA" targeted for registration.

The address directory registration section 102 registers: the electronic mail address acquired from the memory readout section 113 and maintained therein; and the name and telephone number acquired from the control section 115. In other words, this registration section registers the name "Masataka UEDA", the telephone number "090-5142-5844", and the electronic mail address "ueda@masa.com" as address directory information relating to the communication partner "Masataka UEDA".

As shown in FIG. 1, in the case where mail data has been stored in the e-mail temporary storage memory 111, an electronic mail address is stored in a history temporary storage memory 112 from this mail data. Therefore, the history temporary storage memory 112 stores the electronic mail addresses that correspond to transmitters of electronic mails received by this mobile communication terminal device 100 in the past. Using the thus stored electronic mail addresses, a processing operation similar to that described above is executed, thereby making it possible to register address directory information relating to a communication partner that corresponds to the electronic mail address.

Producing Mail

Figure 7:
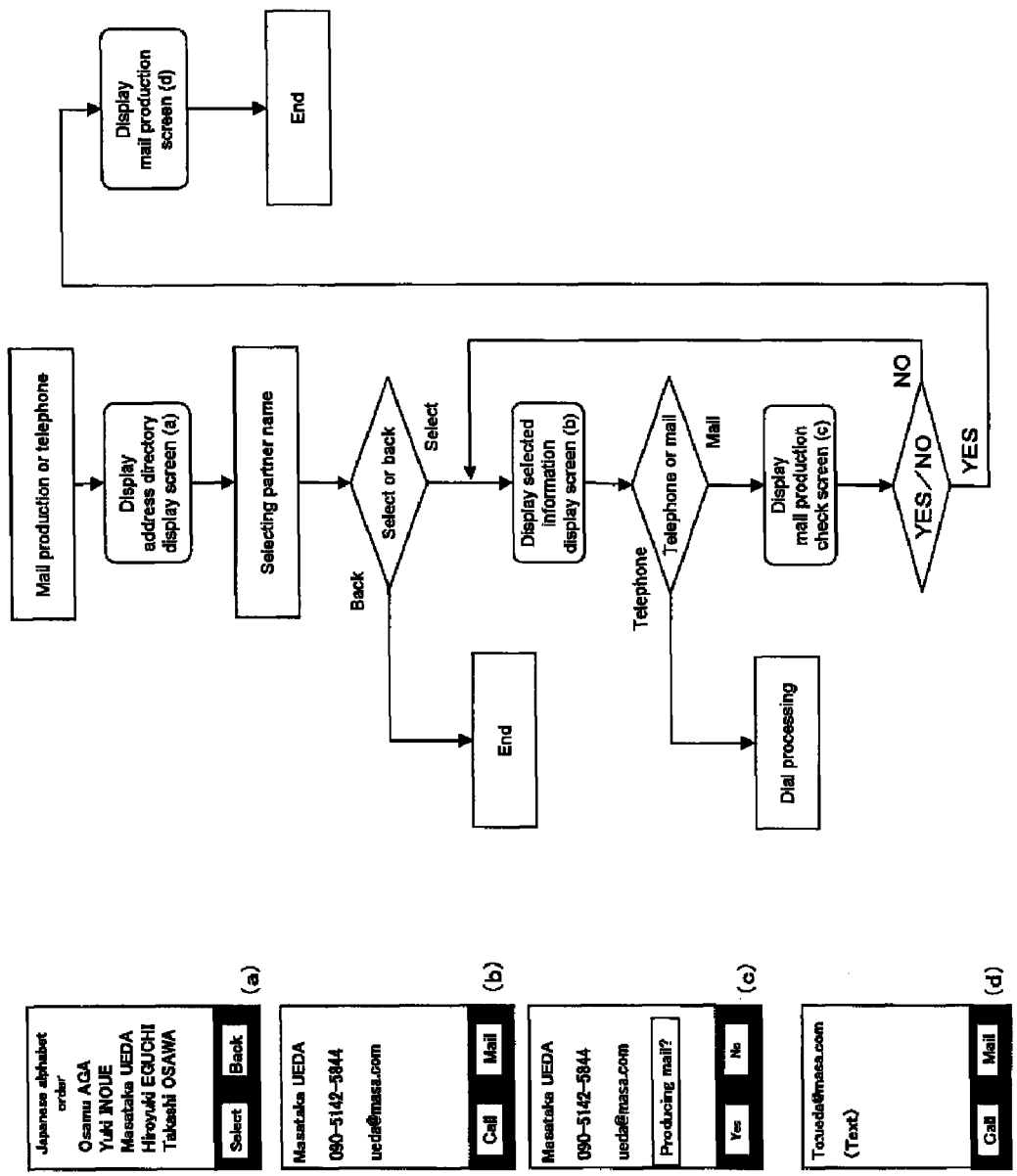
FIG. 7 is a diagram showing a mode of utilizing the address directory of the mobile communication terminal device according to the present invention.

Now, with reference to FIG. 7 in addition to FIG. 1, a description will be given with respect to a method of utilizing address directory information in a mobile communication terminal device 100. FIG. 7 is a schematic diagram depicting a specific example of information displayed at a display section when utilizing address directory information in the mobile communication terminal device according to the first embodiment of the present invention.

In the case of transmitting an electronic mail to a certain communication partner, a user must specify an electronic mail address of that communication partner as a transmission destination address when producing the electronic mail. In this case, the user operates buttons provided at a mobile communication terminal device 100, thereby making it possible to input the electronic mail address of that communication partner on one by one character basis, whereas the user can input the electronic mail address of that communication partner by a simplified operation utilizing the address directory information relating to that communication partner. Now, a description will be given with respect to transmission of an electronic mail using address directory information.

The user makes a predetermined operation using buttons provided at this mobile communication terminal device 100 in order to read out address directory information. In this manner, the input section 101 can output a signal indicating the fact that a request is made to read out address directory information to the control section 115 and the address directory acquisition section 105.

The address directory acquisition section 105 having received operational information indicating readout of address directory information outputs a signal indicating the fact a request is made to read out address directory information to the address directory readout section 104. The address directory readout section 104 having received this signal reads out from an address directory information storage section 103 the address directory information relating to all the communication partners (five persons "Osamu AGA", "Yuki INOUE", "Masataka UEDA", "Hiroyuki EGUCHI, and "Takashi OSAWA" as shown in FIG. 7(a)), and then, outputs the read out information to the control section 115.

The control section 115 maintains the address directory information received from the address directory readout section 104.

The display section 114 having received control of the control section 115, as shown in FIG. 7(a), displays only a name of a communication partner among the address directory information stored in the address directory storage section 103.

In a state in which the display shown in FIG. 7(a) is made by the display section 114, in the case where the user has specified a communication partner ("Masataka UEDA") that is a transmission destination by making a predetermined button operation and has depressed a button that corresponds to "Select", the input section 101 outputs the operational information indicating the fact to the control section 115.

The display section 114 having received control of the control section 115, as shown in FIG. 7(b), displays address information relating to a communication partner "Masataka UEDA" specified as a transmission destination.

In a state in which the display shown in FIG. 7(b) is made by the display section 114, in the case where the user has depressed a button that corresponds to "Mail", the input section 101 outputs the operational information indicating the fact to the control section 115. The display section 114 having received control of the control section 115, as shown in FIG. 7(c), makes a display "Do you want to produce an e-mail?" asking whether or not to produce an electronic mail to "Masataka UEDA" specified as a transmission destination.

In a state in which the display shown in FIG. 7(c) is made by the display section 114, in the case where the user has depressed a button that corresponds to "No", the input section 101 outputs the operational information indicating the fact to the control section 115. The display section 114 having received control of the control section 115 displays the information shown in FIG. 7(b) again.

Conversely, in the case where the user has depressed a button that corresponds to "Yes", the input section 101 outputs the information indicating the fact to the control section 115. The display section 114 having received control of the control section 115, as shown in FIG. 7(d), displays a screen indicating mail production. At an upper part of the screen shown in FIG. 7(d), an electronic mail from "Masataka UEDA" that is a communication partner as a transmission destination is displayed. Just below the upper part of the screen display, an e-mail text to be transmitted to this communication partner is displayed.

In this state, the user input the e-mail text to be transmitted to the communication partner, via a button operation, whereby the operational information corresponding to this button operation is outputted from the input section 101 to the control section 115. As a result, the display section 114 having received control of the control section 115 displays the e-mail text inputted by the user.

In the case where the user has depressed a button that corresponds to "Mail" after completing input of the e-mail text, the input section 101 outputs the operational information indicating the fact to the control section 115. The control section 115 outputs an e-mail production section 107 the electronic mail address of "Masataka UEDA that is a communication partner as a transmission destination and the e-mail text to be transmitted to this communication partner.

The e-mail production section 107 uses the electronic mail address of "Masataka UEDA" received from the control section 115 that is a communication partner as a transmission destination; the main text to be transmitted to this communication partner, and an electronic mail address of the user of this mobile communication terminal device 100, to produce the electronic mail data for this communication partner and output the produced data to an e-mail transmission section 108. The e-mail transmission section 108 applies predetermined encoding to the electronic mail data produced by the e-mail production section 107, and then, outputs the electronic mail data applied by encoding to a server communication section 109. The server communication section 109 applies a modulation processing operation and a frequency conversion processing operation or the like to the electronic mail data encoded by the e-mail transmission section 108, thereby producing an electronic mail, and then, transmitting the produced electronic mail to a communication network 200.

The electronic mail thus transmitted by the mobile communication terminal device 100 is received via the communication network 200 by the communication partner "Masataka UEDA" specified as a transmission destination.

Embodiment 1

A description will be given with respect to a first embodiment for utilizing address directory information on a mobile communication terminal device 100 shown in FIG. 1 as a white list of an e-mail server.

A user makes a predetermined operation using buttons provided at this mobile communication terminal device 100 in the case where an attempt is made to transmit to a server device 300 the address directory information relating to each of the communication partners stored in the address directory storage section 103 of the mobile communication terminal device 100 (for example, in the case where the user has never transmitted the address directory information to the server device 300). In this manner, an input section 101 outputs operational information indicating transmission of address directory information to a control section 115 and an address directory acquisition section 105.

The address directory acquisition section 105 having received the operational information indicating transmission of address directory information outputs a signal indicating the fact that a request is made to read out address directory information to an address directory readout section 104. The address directory readout section 104 having received this signal reads out from the address directory storage section 103 the address directory information relating to all the communication partners stored in the address directory storage section 103 at the current time point (five persons "Denjiro KOGURE", "Kengo MORI", "Hikaru SHINOMIYA", "Taro YAMADA", and "Hidehiko ICHIMURA", as shown in FIG. 1), and then, outputs the read out information to the address directory acquisition section 105.

The address directory acquisition section 105 having received the address directory information produces address directory information data by using this address directory information, and then, outputs the produced address directory information data to an address directory information transmission section 106. The address directory information transmission section 106 applies predetermined encoding to the address directory information data received from the address directory acquisition section 105, and then, outputs to a server communication section 109 the address directory information data applied with encoding.

The server communication section 109 makes a predetermined transmission processing operation such as a modulation processing operation or a frequency conversion or the like to the encoded address directory information data, thereby producing a transmit signal. Then, the server communication section 109 transmits the produced transmit signal to a communication network 200. After transmission by the server transmission section 109 has been made, a display section 114 having received control of a control section 115 can display the fact that transmission of address directory information has been made.

This transmit signal is received via the communication network 200 by means of a server device 300 that covers this mobile communication terminal device 100. Specifically, the transmit signal transmitted by the mobile communication terminal device 100 is received by a mobile unit communication section 301 of the server device 300. The mobile unit communication section 301 applies predetermined receiving processing operations such as frequency conversion and demodulation processing operation or the like to the received signal (receive signal), and then, outputs to an address directory receiving section 303 the receive signal applied with the receiving processing operation. The address directory receiving section 303 applies predetermined decoding to the receive signal applied with the receiving processing operation, thereby acquiring the address directory information data relating to a user of the mobile communication terminal device 100. Then, the address directing receiving section 303 outputs to a white list management section 304 the address directory information data acquired.

A white list management section 304 registers a white list relating to the user of the mobile communication terminal device 101 in a white list storage section 305 by using the address directory information data received from the address directory receiving section 303. Specifically, the white list management section 304 registers in the white list storage section 305 the electronic mail address (and further, telephone number) of a communication partner included in the address directory information on this mobile communication terminal device 100 to the white list relating to the user of the mobile communication terminal device 100. The white list management section 304 registers in the white list storage section 305 the electronic mail address (and further, telephone number) of a respective one of "Denjiro KOGURE", "Kengo MORI", "Hikartu SHINOMIYA", "Taro YAMADA", and "Hidehiko ICHIMURA" with respect to the white list relating the user (here, "Nagio INNOSHIMA") of the mobile communication terminal device 100. As a result, the white list storage section 305 maintains a white list on a user by user basis (for example, a respective one of "Nagio INNOSHIMA", "Hanako OSAWA", "Taro YAMADA", and "Hidehiko ICHIMURA" in FIG. 1).

On the other hand, after the user has transmitted the address directory information to the server device 300 as described above, in the case where the user makes new registration or updating registration of address directory information in accordance with any one of the first registration method to the third registration method described above (further, in the case where the contents (electronic mail address or telephone number of address directory information relating to the registered communication partners have been changed), there occurs a difference between the contents stored in the address directory storage section 103 of the mobile communication terminal device 100 and the contents stored in the white list storage section 305 of the server device 300. Specifically, there can occurs: a circumstance that there is a difference between an electronic mail address (or telephone number) relating to a communication partner stored in the address directory storage section 103 of the mobile communication terminal device 100 and an electronic mail address (or telephone number) relating to that communication partner stored in the white list storage section 305 of the server device 300; or a circumstance that an electronic mail address or a telephone number of that communication partner is not registered at all in the white list storage section 305 of the server device 300, although the address directory information relating to the communication partner in the address directory storage section 103 of the mobile communication terminal device 100 has been registered.

Therefore, in the case where the user has made new registration or updating registration of address directory information in the first registration method to the third registration method described above or in the case where the registered address directory information has been changed, an address directory registration section 102 having detected that new registration, updating registration, or change of such address directory information has been made outputs information indicating transmission of address directory information to the address directory acquisition section 105. In this manner, as described above, the address directory acquisition section 105 outputs a signal indicating the fact that a request is made to read out address directory information to the address directory readout section 104. Thus, as a result, address directory information obtained after new registration, updating registration or change is transmitted to the server device 300.

From the viewpoint of reduction of a communication quantity/communication time, it is not proper to transmit address directory information relating to all the communication partners every time new registration, updating registration or change is made to address directory information. Thus, it is preferable to transmit to the server device 300 only a difference obtained when new registration, updating registration or change has been made. In order to achieve this, an address directory readout section 104 reads out from an address directory storage section 103 only the address directory information relating to a communication partner, the information obtained when new registration, updating registration, or change has been made, and then, the address directory acquisition section 105 may produce the address directory information data by using only this address directory information.

In the case where the user has made new registration or updating registration of address directory information in accordance with the first registration method to the third registration method described above or in the case where the registered address directory information has been changed, the mobile communication terminal device 100 can transmit to the server device 300 all or part of the address directory information described above by the user making button operation indicating that a request is made to transmit address directory information.

In this manner, the identity between the contents stored in the address storage section 103 of the mobile communication terminal device 100 and the contents stored in the white list storage section 305 of the server device 300 can be maintained.

Mail Distribution Operation Using White List

Now, a description will be given with respect to an operation of distributing an electronic mail using a white list in a server device 300. Here, a description will be given with respect to a case in which a user of a mobile communication terminal device 100 is "Nagio INNOSHIMA" and a respective one of a transmitter "Kengo MORI" and a transmitter "Hanako OSAWA" transmits an electronic mail to "Nagio INNOISHIMA". As is evident from FIG. 1, the electronic mail address "kengo@mail.com" of "Kengo MORI" is registered in the white list relating to "Nagio INNOSHIMA" in the white list storage section 305 of the server device 300, whereas the electronic mail address (and telephone number) of "Hanako OSAWA" is not registered.

First, the electronic mail transmitted from "Hanako OSAWA" to "Nagio INNOSHIMA" is received via another device or exchange unit (an external communication section 306" of the server device 300 that covers the mobile communication terminal device 100 of "Nagio INNOSHIMA". The external communication section 306 applies to this electronic mail a predetermined receiving processing operation (a demodulation processing operation or the like that corresponds to the modulation processing operation made to this electronic mail for the purpose of communication between this server device 300 and another server device or exchange unit), and then, outputs to a mail receiving section 307 the electronic mail obtained when the receiving processing operation has been made. The mail receiving section 307 decodes the electronic mail obtained when the receiving processing operation has been made, thereby extracting the electronic mail data (including an e-mail text, a title, an electronic mail address of a transmitter, and an electronic mail address of a receiver or the like), and then, outputting the extracted electronic mail data to a mail relay judgment section 308.

The mail relay judgment section 308 uses the white list stored in the white list storage section 305 to judge whether or not to distribute the electronic mail data from the mail receiving section 307 to a receiver included in this electronic mail data. Specifically, the mail relay judgment section 308 outputs this electronic mail data to a mail relay section 309 only in the case where the electronic mail address of a transmitter included in the electronic mail data from the mail receiving section 307 is registered in the white list relating to a receiver included in this electronic mail data. Here, the electronic mail address of a transmitter (i.e., "Hanako OSAWA") included in the electronic mail data from the mail receiving section 307 is not registered in the white list relating to (the electronic mail address of) the receiver included in this electronic mail data (i.e., Nagio INNOSHIMA). Thus, the mail relay judgment section 308 aborts this electronic mail data without being outputted to the mail relay section 309.

Even in the case where the electronic mail has been thus transmitted to "Nagio INNOSHIMA" and the electronic mail address of a transmitter of mail is not registered in a white list relating to "Nagio INNOSHIMA", the transmitted electronic mail is judged and aborted as an electronic mail whose reception is rejected by "Nagio INNOSHIMA".

Next, the electronic mail transmitted from "Kengo MORI" to "Nagio INNOSHIMA" is also received via another server device or exchange unit to (the external communication section 306 of) the server device 300 that covers the mobile communication terminal device 100 of "Nagio INNOSHIMA". Then, a processing operation similar to the operation described above is made, whereby a mail receiving section 307 outputs electronic mail data to a mail relay judgment section 308. The mail relay judgment section 308 outputs electronic mail data to a mail relay section 309 because the electronic mail address of a transmitter (i.e., "Kengo MORI") included in the electronic mail data from the mail receiving section 307 is registered in (the electronic mail address of) white list relating to the receiver (i.e., Nagio INNOSHIMA) included in this electronic mail data. The mail relay section 309 applies predetermined encoding to the electronic mail data from the mail relay judgment section 308, and then, outputs to the mobile unit communication section 301 the electronic mail data obtained when encoding has been made.

The mobile unit communication section 301 applies a predetermined transmission processing operation including a modulation processing operation or the like to the electronic mail data obtained when encoding is made, thereby generating an electronic mail and transmitting the generated electronic mail to a communication network 200. Thus, the transmitted electronic mail by the server device 300 is received via the communication network 200 by "Nagio INNOSHIMA" specified as a transmission destination, i.e., the mobile communication terminal device 100.

In this manner, in the case where an electronic mail has been thus transmitted to "Nagio INNOSHIMA" and the electronic mail address of a transmitter of this electronic mail is registered in a white list relating to "Nagio INNOSHIMA", such electronic mail is judged as an electronic mail allowed for reception by "Nagio INNOSHIMA", and then, the judged mail is distributed to "Nagio INNOSHIMA".

Embodiment 2

According to the first embodiment described above, in the case where an address directory registration section 102 recognizes that new registration, updating registration, or change of address directory information has been made in order to maintain identity between the contents stored in an address directory storage section 103 of a mobile communication terminal device 100 and the contents stored in a white list storage section 305 of a server device 300, a mobile communication terminal device transmits address directory information to the server device 300.

Instead of carrying out transmission of address directory information to an e-mail server by a user operation, a mobile communication terminal device can transmit address directory information to the server device 300 every time a predetermined time has elapsed. Now, a second embodiment will be described here.

Figure 8:
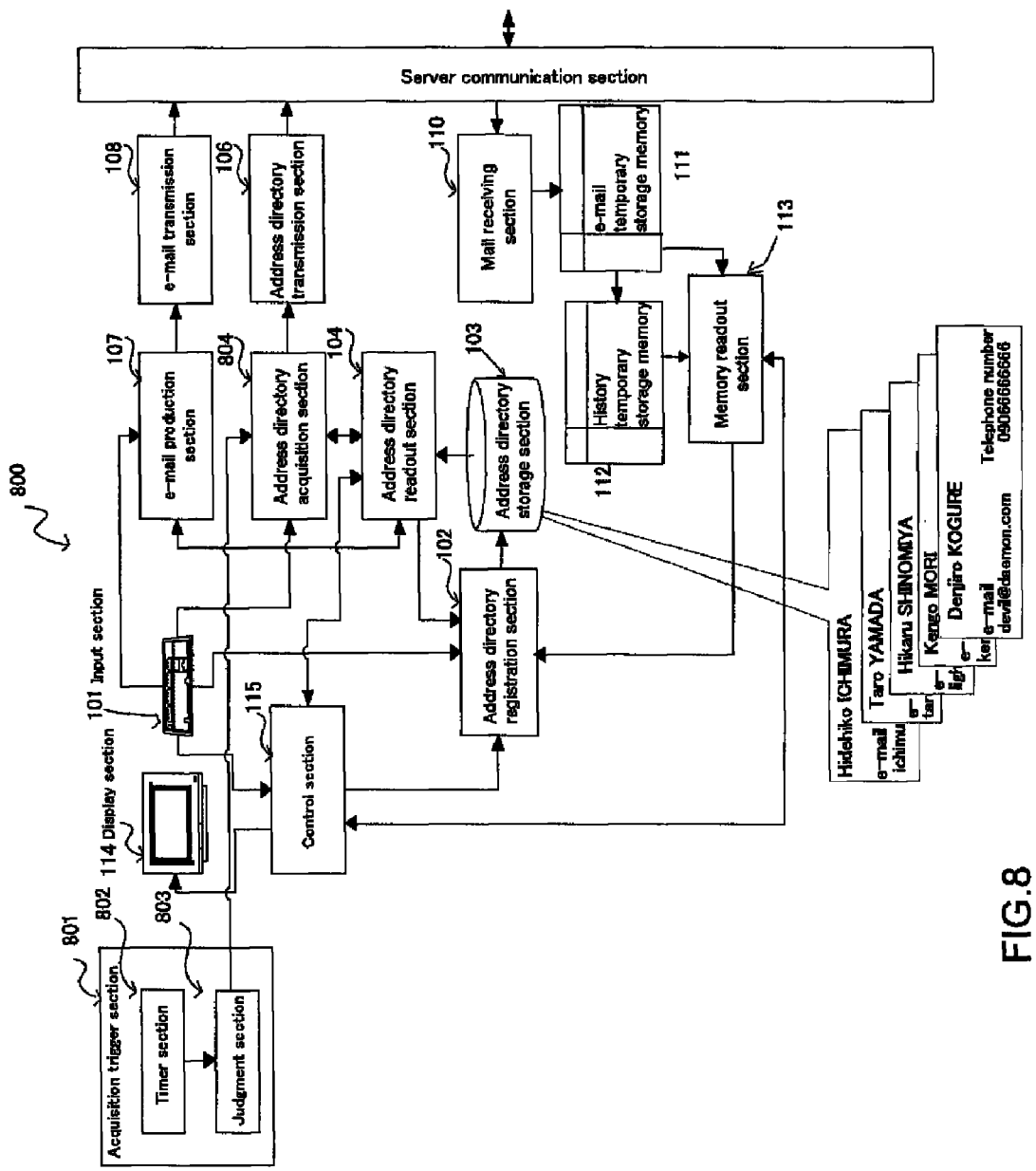
FIG. 8 is a block diagram of a second embodiment of the present invention.

FIG. 8 is a block diagram depicting a configuration of a mobile communication terminal device 800 according to a second embodiment of the present invention. In FIG. 8, like constituent elements shown in FIG. 1 is designated by like reference numerals shown in FIG. 1. A detailed description will not be described here.

The mobile communication terminal device 800 according to the present embodiment employs a configuration of adding an acquisition trigger section 801 to the mobile communication terminal device 100 shown in FIG. 1 and using an address directory acquisition section 804 instead of an address directory acquisition section 105.

The acquisition trigger section 801 outputs a signal indicating the fact that a request is made to transmit address directory information to the address directory acquisition section 105 every time a predetermined time has elapsed. Specifically, the acquisition trigger section 801 includes: a timer section 802 having a clock function and a clock result from the timer section 802; and a judgment section 803 for judging whether or not a predetermined time has elapsed based on a case in which it is judged that the predetermined time has elapsed; and, only in the case where it is judged that the predetermined time has elapsed, outputting a signal indicating the fact that a request is made to transmit address directory information to an address directory acquisition section 804.

The address directory acquisition section 804 outputs a signal indicating the fact that a request is made to read out address directory information to an address directory readout section 104 only in the case of receiving operational information indicating transmission of address directory information by means of a judgment section 803. Hereinafter, a processing operation similar to that described in the first embodiment is made, whereby an address directory information transmission section 106 outputs to a server communication section 109 the address directory information applied with encoding, a server communication section 109 produces a transmit signal, and then, transmits the produced signal to a communication network 200. As a result, the server device 300 registers in a white list storage section 305 an electronic mail address (and further, telephone number) of a communication partner included in address directory information on a mobile communication terminal device 800 with respect to a white list relating of a user of the mobile communication terminal device 800.

As described above, according to the present embodiment, the mobile communication terminal device 800 transmits to a server device every predetermined time the address directory information stored in an address directory storage section 103. Thus, even in the case where the mobile communication terminal device 800 has made new registration, updating registration, or change of address directory information, the identity between the contents stored in the address directory information on the mobile communication terminal device 100 and the contents stored in the white list storage section 305 of the server device 300 can be reliably maintained.

Embodiment 3

In the second embodiment described above, in order to maintain the identity between the contents stored in an address directory storage section 103 of a mobile communication terminal device 800 and the contents stored in a white list storage section 305 of a server device 300, the mobile communication terminal device 800 transmits address directory information voluntarily every time a predetermined time has elapsed. However, an e-mail server can provide a configuration of requesting transmission the contents stored in an address directory to the mobile communication terminal device at a predetermined time point. Now, a description will be given with respect to a third embodiment of a mobile communication terminal device transmitting address directory information to this server device in response to a request from the server device.

Figure 9:
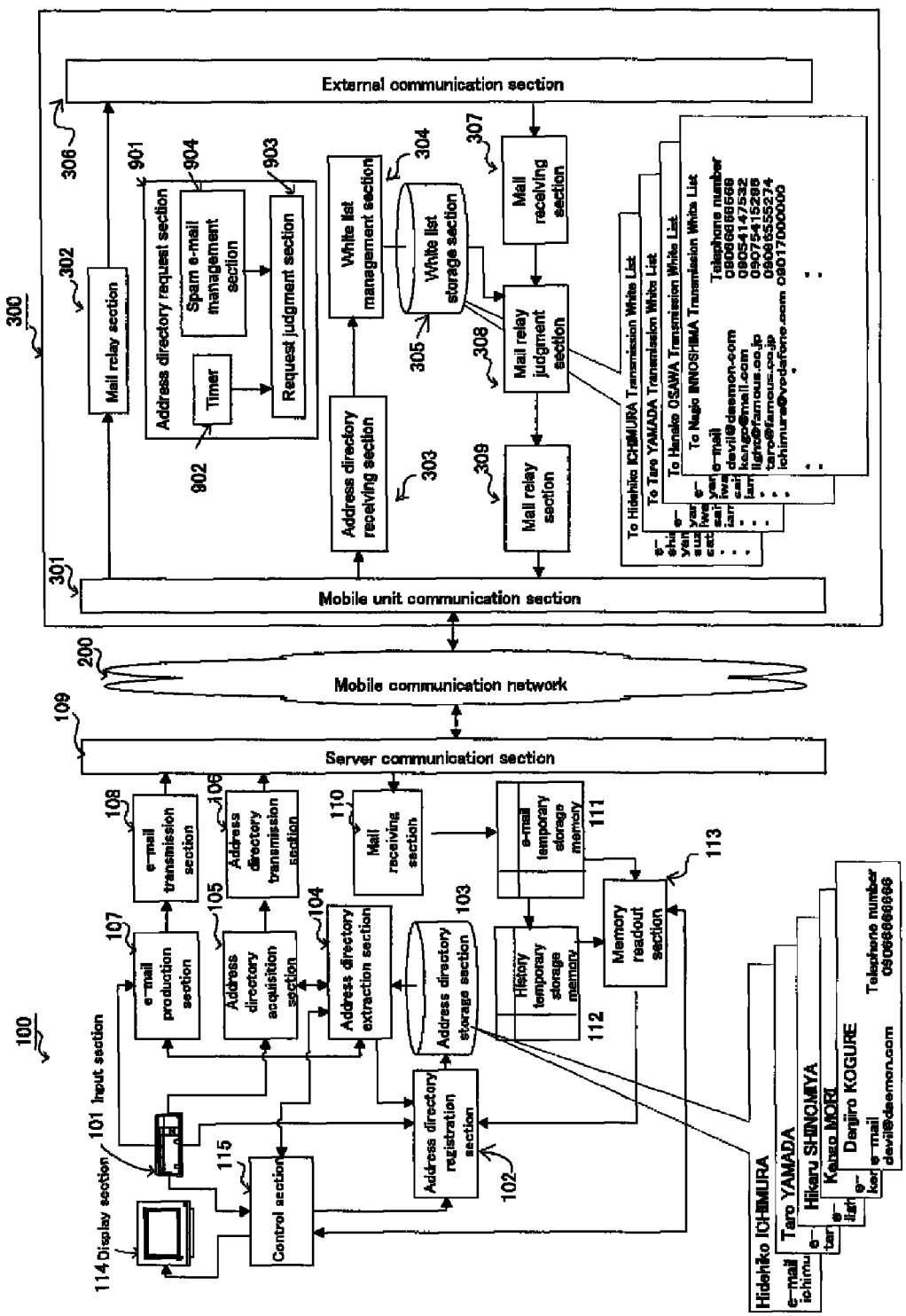
FIG. 9 is a block diagram of a third embodiment of the present invention.

FIG. 9 is a block diagram depicting a configuration of a communication system including a mobile communication terminal device and a server device according to the third embodiment of the present invention. In FIG. 9, like constituent elements shown in FIG. 1 are designated by like reference numerals shown in FIG. 1. A detailed description will not be described here.

A server device 900 according to the present embodiment employs a configuration of adding an address directory request section 901 to the server device 300 shown in FIG. 1 and using a mobile unit communication section 905 instead of a mobile unit communication section 301.

A mobile communication terminal device 1000 according to the present embodiment employs a configuration of using a server communication section 1001 and an address directory acquisition section 1002 respectively instead of a server communication section 109 and an address directory acquisition section 105 in the mobile communication terminal device 100 shown in FIG. 1.

The address directory request 901 outputs to the mobile unit communication section 905 a signal indicating the fact that a request is made to transmit address directory information in the case where an electronic mail address of a transmitter of an unsolicited bulk e-mail has been newly obtained. The address directory request section 901 includes a timer section 902, a Spam list management section 904, and a request judgment section 903. Specifically, the timer section 902 has a clock function and outputs a clock result to the request judgment section 903. The Spam list management section 904 has a Spam list for registering an electronic mail address of a transmitter of an unsolicited bulk e-mail. Then, this management section can register in the Spam list a new electronic mail address of (a transmitter of an unsolicited bulk e-mail) acquired via an operator's input operation. Alternatively, the Spam list management section 904 can register in the Spam list the electronic mail address acquired (received) via a communication line (not shown). This Spam list acquisition section 904 judges that "there currently is established a state in which a change has occurred in a communication network for use in transmission and reception of an electronic mail, and this state is a change of updating a white list" in the case where a new electronic mail address has been acquired, and a signal indicating the fact is outputted to the request judgment section 903.

The request judgment section 903 first judges whether or not a predetermined time has elapsed based on a clock result from the timer section 902, and then, outputs to the mobile unit communication section 905 a signal indicating the fact that a request is made to transmit address directory information in the case where it is judged that the predetermined time has elapsed. Further, the request judgment section 903 outputs to the mobile unit communication section 905 a signal indicating the fact that a request is made to transmit address directory information in the case where the judgment section has received information indicating that a new electronic mail address has been acquired, from the Spam list management section 904.

The mobile unit communication section 905 applies a predetermined transmission processing operation such as a modulation processing operation to a request signal indicating the fact that a request is made to transmit address directly information to a mobile communication terminal device in the case where this communication section has received a signal indicating the fact that a request is made to transmit address directory information from a request judgment section 903, thereby generating a transmit signal, and then, transmitting the generated signal to a communication network 200. Thus, the transmitted transmit signal is received via the communication network 200 by a mobile communication terminal device 1000 (specifically, a server communication section 1001).

The server communication section 1001 extracts a request signal indicating the fact that a request is made for address directory information from a server device 900, and then, outputs the fact to an address directory acquisition section 1002 in accordance with a receiving processing operation including a demodulation processing operation or the like relevant to a received signal, in addition to the configuration described in the first or second embodiment described above.

The address directory acquisition section 1002 outputs a signal indicating the fact a request is made to read out address directory information to an address directory readout section 104 in the case where the acquisition section has received a signal indicating the fact that a request signal has been extracted from the server communication section 1001. Hereinafter, a processing operation similar to that described in the first embodiment is made, whereby the address directory information transmission section 106 outputs to a server communication section 109 the address directory information data applied with encoding, and then, the server communication section 109 produces a transmit signal, and then, transmits the produced signal to the communication network 200.

As described above, according to the present embodiment, the mobile communication terminal device 1000 transmits address directory information to the server device 900 in response to a request from the server device 900. In this manner, a configuration of the mobile communication terminal device can be simplified as compared with the second embodiment described above, while the identity between the contents stored in the address directory information on the mobile communication terminal device 100 and the contents stored in the white list storage section 305 of the server device 300 is reliably maintained. Further, in the case where a change (impact) has occurred with a communication network for use in transmission of an electronic mail to the mobile communication terminal device, the server device covering this mobile communication terminal device requests transmission of address directory information to this mobile communication terminal device, whereby a white list relating to a user of this mobile communication terminal device can be updated at a proper period of time.

The present invention can be applied to a configuration in which the mobile communication terminal device 1000 transmits address directory information to the server device 900 voluntarily or in response to a request from the server device 900 and at an arbitrary timing.

Embodiment 4

The first to third embodiments each have been applied to distribution of an electronic mail to a mobile communication terminal device. That is, in each of the embodiments described above, a server device actually distributes to this mobile communication terminal device an electronic mail transmitted by a communication partner having registered an electronic mail address in address directory information on this mobile communication terminal device from among the electronic mails transmitted to a user of the mobile communication terminal device. However, the present invention can be applied to distribution of a short mail to the mobile communication terminal device. That is, the server device can actually distribute this mobile communication terminal device only the short mail transmitted by a communication partner having registered a telephone number in the address directory information on this mobile communication terminal device from among the short mails transmitted to the user of the mobile communication terminal device. Now, a description will be given with respect to a fourth embodiment in which the present invention has been applied to a short mail.

Operation of Transmitting Short Mail in Mobile Communication Terminal Device 100

An e-mail production section 107 uses a telephone number of "Masataka UEDA", for example, that is a communication partner as a transmission destination, a telephone number of a user of this mobile communication terminal device 100, and an e-mail text to be transmitted to this communication partner, to produce short mail data relevant to this communication partner and output the produced data to an e-mail transmission section 108. The e-mail production section 107 can acquire a telephone number of a communication partner as a transmission destination from the address directory information stored in a address directory storage section 103 or can acquire the telephone number from operational information obtained by a user's operation relevant to an input section 101.

The e-mail transmission section 108 applies predetermined encoding to the short mail data produced by the e-mail production section 107, and then, outputs to a server communication section 109 the short mail data applied with encoding.

The server communication section 109 applies a predetermined transmission processing operation such as conversion processing operation or a frequency conversion processing operation to the encoded short mail data, thereby producing a short mail. Then, the server communication section 109 transmits the produced short mail to a communication network 200 via a control channel. This control channel is responsible for transmission of a control signal used in order to establish a communication channel (channel responsible for transmission of voice signal) when a mobile communication terminal 101 makes voice communication with another mobile communication terminal.

Specifically, the server communication section 109 inserts a short mail into a preliminary portion that is not actually used at the time of establishment of a communication channel among the above control signal. In this manner, a short mail is transmitted as a control signal to a mobile communication terminal device that is a communication partner via one or more exchange units.

Operation of Distributing Short Mail Using White List

Now, a description will be given with respect to a case of a respective one of a transmitter "Kengo MORI" and a transmitter "Hanako OSAWA" transmitting a short mail to "Nagio INNOSHIMA". As is evident from FIG. 1, the telephone number "09054147532" of "Kengo MORI" has been registered in a white list relating to "Nagio INNOSHIMA" in a white list storage section 305 of a server device 300, whereas the telephone of "Hanako OSAWA" is not registered.

First, a short mail transmitted from "Hanako OSAWA" to "Nagio INNOSHIMA" as part of a control signal is received to (an external communication section 306) of the server device 300 covering the mobile communication terminal device 100 of "Nagio INNOSHIMA" via one or more exchange units. The external communication section 306 extracts a short mail from among a control signal, and then, applies a predetermined receiving processing operation to the extracted short mail. Then, the external communication section 306 outputs to a mail receiving section 307 a short mail obtained by the receiving processing operation has been made. By decoding the short mail obtained when the receiving processing operation has been made, the mail receiving section 307 extracts short mail data (including an e-mail text, a transmitter's telephone number, and a receiver's telephone number or the like), and then, outputs the extracted short mail data to a mail relay judgment section 308.

The mail relay judgment section 308 uses a white list stored in a white list storage section 305 to judge whether or not to distribute the short mail data from the mail receiving section 307 to a receiver included in the short mail data. Specifically, the mail relay judgment section 308 outputs this electronic mail data to the mail relay section 309 only in the case where a telephone number of a transmitter included in the short mail data is registered in a white list relating to a receiver included in this short mail data. Here, the telephone number of a transmitter (i.e., "Hanako OSAWA") included in the short mail data from the mail receiving section 307 is not registered in the white list relating to (a telephone number of) a receiver (i.e., "Nagio INNOSHIMA") included in this short mail data. Thus, the mail relay judgment section 308 aborts this short mail data without being outputted to the mail relay section 309.

The short mail transmitted from "Kengo MORI" to "Nagio INNOSHIMA" is also received as part of a control signal to (an external communication section 306 of) a server device 300 covering the mobile communication terminal device 100 of "Nagio INNOSHIMA" via one or more exchange units. Hereinafter, a processing operation similar to that described above is made, whereby the mail receiving section 307 outputs the short mail data to the mail relay judgment section 308. In the mail relay judgment section 308, the telephone number of a transmitter (i.e., "Kengo MORI") included in the short mail data from the mail receiving section 307 is registered in a white list relating to a receiver (i.e., "Nagio INNOSHIMA") included in this short mail data, and thus, this short mail data is outputted to the mail relay section 309. The mail relay section 309 applies to predetermined encoding to the short mail data from the mail relay judgment section 308, and then, outputs to the mobile unit communication section 301 the electronic mail data obtained when encoding has been made.

The mobile unit communication section 301 applies to a predetermined transmission processing operation such as a modulation processing operation or a frequency conversion processing operation to encoded short mail data, thereby producing a short mail. Then, the mobile unit communication section 301 transmits the produced short mail to a communication network 200 via a control channel. As a result, this short mail is received as a control signal by means of the mobile communication terminal device 100 of "Nagio INNOSHIMA" via one or more exchange units.

Embodiment 5

In each of the embodiments described above, an electronic mail transmitted to a specific communication partner is actually distributed to the specific communication partner in the case where an "electronic mail address" of a transmitter of this electronic mail is registered in a white list relating to this specific communication partner. However, even if a "telephone number" of the transmitter of this electronic mail has been registered in the white list relating to this specific communication partner, if the "electronic mail address" of this transmitter is not registered in the white list, the electronic mail transmitted from this transmitter to this specific communication partner is not distributed to this specific communication partner.

Similarly, a short message transmitted to a specific communication partner is actually distributed to this specific communication partner in the case where a "telephone number" of a transmitter of this short mail is registered in a white list relating to this specific communication partner. However, even if an "electronic mail address" of the transmitter of this short message has been registered in the white list relating to this specific communication partner, if a "telephone number" of this transmitter is not registered in the white list, the short message from this transmitter is not distributed to this specific communication partner.

This problem will be described with reference to FIG. 10. When a server device receives an electronic mail to "Nagio INNOSHIMA", in the case where a transmitter of this electronic mail is "Taro YAMADA", an electronic mail address of "Taro YAMADA" is not registered in a white list relating to "Nagio INNOSHIMA", and thus, the server device does not actually distribute this electronic mail to "Nagio INNOSHIMA". However, a telephone number of "Taro YAMADA" is registered in the white list relating to "Nagio INNOSHIMA". That is, it is possible to identify that "Nagio INNOSHIMA" desires to receive an electronic mail as well as to receive a short message from "Taro YAMADA". Therefore, the server device should distribute this electronic mail to "Nagio INNOSHIMA".

Similarly, when the server device receives a short message to "Nagio INNOSHIMA", in the case where a transmitter of this short message is "Kengo MORI", the telephone number of "Taro YAMADA" is not registered in the white list relating to "Nagio INNOSHIMA", and thus, the server device does not actually distribute this short message to "Nagio INNOSHIMA". However, an electronic mail address of "Kengo MORI" is registered in the white list relating to "Nagio INNOSHIMA". That is, it is possible to identify that "Nagio INNOSHIMA" desires to receive a short message as well as to receive the electronic mail from "Kengo MORI". Therefore, the server device should distribute this short message to "Nagio INNOSHIMA". However, this short message is not distributed to "Nagio INNOSHIMA" by virtue of the reason similar to the above.

As described above, the server device merely judges whether or not an "electronic mail" ("short message") transmitted from a transmitter to a specific communication partner is actually distributed to this specific communication partner based on whether or not an "electronic mail address" ("telephone number") of this transmitter is registered in a white list relating to a communication partner of this specific communication partner.

Therefore, when the server device according to the present embodiment has received an "electronic mail" transmitted from a transmitter to a specific communication partner, there remains a possibility that a "telephone number" of this transmitter (hereinafter, referred to as an "unauthorized person") is registered in a white list relating to this specific communication partner. In view of this possibility, the server device executes the following processing operation instead of merely aborting the electronic mail of this unauthorized person. (For the sake of convenience, a transmitter whose electronic mail address is not registered in a white list as described above is referred to as an "unauthorized person".) That is, the server device requests a telephone number of this unauthorized person to a management server having stored therein telephone numbers and electronic mail addresses of all subscribers in association with each other while an electronic mail address of an unauthorized person is defined as a search key.

If the management server stores the electronic mail address of this unauthorized person, the server also stores a telephone number of this unauthorized transmitter. Thus, the server device acquires the telephone number of this unauthorized person from the management server. Then, in the case where the telephone number acquired from the management server is registered in the white list relating to the specific communication partner described above, the server device judges that "the electronic mail from this unauthorized person is an electronic mail desired to be received by this specific communication partner", and then, distributes this electronic mail to this specific communication partner.

On the other hand, if the management server does not store the electronic mail address of this unauthorized person, the server device aborts the electronic mail from this unauthorized person as is the case with each of the embodiments described above.

When the server device according to the present embodiment has received a "short message" transmitted from a transmitter to a specific communication partner, in the case where a "telephone number" of this transmitter is not registered in a white list relating to this specific communication partner, there remains a possibility that an "electronic mail address" of this transmitter (hereinafter, referred to as an "unauthorized person" similarly) is registered in the white list relating to this specific communication partner. In view of this possibility, the server device executes the processing operation similar to that described above instead of merely aborting the short message of this unauthorized person.

The present embodiment will be described in detail with reference to FIG. 10 and FIG. 11. FIG. 10 is a schematic diagram depicting an example of information stored in a white list in a server device according to a fifth embodiment of the present invention. FIG. 11 is a block diagram depicting a configuration of the server device according to the fifth embodiment of the present invention. In FIG. 11, like constituent elements shown in FIG. 1 are designated by like reference numerals shown in FIG. 1. A detailed description will not be described here. A server device 1100 according to the present embodiment employs a configuration of using a mail relay judgment section 1101, an external communication section 1102, and a white list management section 106, respectively, instead of the mail relay judgment section 308, the external communication section 306, and the white list management section 304 in the server device 300 shown in FIG. 1. These constituent elements will be described while focusing on elements different from those described with reference to FIG. 1.

Here, as an example, consider a case in which an "electronic mail" has been transmitted from a transmitter "Taro YAMADA" to a receiver "Nagio INNOSHIMA". As shown in FIG. 10, a telephone number (090-9655-5724) of "Taro YAMADSA" is registered in a white list relating to "Nagio INNOSHIMA", whereas an electronic mail address (taro@famaous.co.jp) of "Taro YAMADA" is not registered.

The mail relay judgment section 1101 outputs the electronic mail address of this transmitter (i.e., unauthorized person) to the external communication section 1102 in the case where the electronic mail address of the transmitter included in the electronic mail data from the mail receiving section 307 is not registered in a white list relating to the receiver included in this electronic mail data. Here, the electronic mail address of the transmitter "Taro YAMADA" is not registered in the white list relating to the receiver "Nagio INNOSHIMA", and thus, the mail relay judgment section 1101 outputs to the external communication section 1102 the electronic mail address of "Taro YAMADA" that is an unauthorized person.

The external communication section 1102 applies a predetermined transmission processing operation to a signal indicating an electronic mail address from the mail relay judgment section 1101, and then, transmits a signal obtained by transmission processing operation to a management server 1104 via a communication network 1103.

The management server 1104 has a database 1105 having stored therein electronic mail addresses and telephone numbers of all subscribers in association with each other. This management server 1104 applies a predetermined receiving processing operation to a signal received via the communication network 1103, and then, extracts an electronic mail address of an unauthorized person "Taro YAMADA" from a signal obtained when the receiving processing operation has been made.

Then, the management server 1104 makes a search for the electronic mail address of the extracted unauthorized person "Taro YAMADA" from the database 1105. In the case where the "electronic mail address" of the unauthorized person has existed in the database 1105, the management server 1104 applies a predetermined transmission processing operation to a signal indicating the "telephone number" of this unauthorized person, and then, transmits a signal obtained by the transmission processing operation to the server device 1102 via the communication network 1103. Conversely, in the case where an electronic mail address of an unauthorized person does not exist in the database 1105, the management server 1104 applies a predetermined transmission processing operation to a signal indicating the fact, and then, transmits a signal obtained by the transmission processing operation to the server device 1102 via the communication network 1103. Here, the electronic mail address (taro@famaous.co.jp) of the unauthorized person "Taro YAMADA" exists in the database 1105, and thus, the telephone number (090-9655-5274) of this unauthorized person "Taro YAMADA" is transmitted to the server device 1100.

The external communication section 1102 applies a predetermined receiving processing operation to a signal received from the management server 1104 via the communication network 1103, thereby extracting a signal indicating a "telephone number" of an unauthorized person or extracting a signal to an extent that a "telephone number" of an unauthorized person is not registered in the database 1105 to output the extracted signal to the mail relay judgment section 1101. Here, the external communication section 1102 outputs a signal indicating the "telephone number" (090-9655-5274) of an unauthorized person "Taro YAMADA" to the mail relay judgment section 1101.

In the case where a "telephone number" of an unauthorized person received from the external communication section 1102 is registered in a white list relating to the receiver, the mail relay judgment section 1101 outputs to the mail relay section 309 the electronic mail data from this unauthorized person. That is, the mail relay judgment section 1101 judges that the electronic mail address of this unauthorized person is registered in this white list by the fact that the "telephone number" of this unauthorized person is registered, although the "electronic mail address" of this unauthorized person is not registered in the white list relating to the receiver. Conversely, in the case where the mail relay judgment section 1101 has received a signal to an extent that the above registration is not made from the external communication section 1102, this judgment section aborts the electronic mail data from this unauthorized person.

Here, the telephone number (090-9655-5274) of the unauthorized person "Taro YAMADA" is registered in a white list relating to a receiver "Nagio INNOSHIMA". Therefore, even if an electronic mail address of a transmitter "Taro YAMADA" included in the electronic mail data from the mail receiving section 307 is not registered in the white list relating to the receiver "Nagio INNOSHIMA" included in this electronic mail data, the telephone number of the transmitter "Taro YAMADA" is registered in the white list relating to "Nagio INNOSHIMA", and thus, the mail relay judgment section 1101 outputs this electronic mail data to the mail relay section 309.

Further, the mail relay judgment section 1101 outputs to a white list management section 1106 an "electronic mail address" of an unauthorized person acquired from the management server 1104, whereby the white list management section 1106 can register an electronic mail address of an unauthorized person in a white list relating to the above receiver. Here, the white list management section 1106, as shown in FIG. 10, can register an electronic mail address of an unauthorized person "Taro YAMADA" acquired from the management server 1104 as an electronic mail address of the unauthorized person "Taro YAMADA" in the white list relating to the receiver "Nagio INNOSHIMA".

Up to now, while a description has been given with respect to an operation when the server device 1100 has received an "electronic mail" transmitted from a transmitter to a specific communication partner, an operation when the server device 1100 has received a "short message" transmitted from a transmitter to a specific communication partner can also be executed in accordance with a concept similar to that described so far.

There is a possibility that a transmitter who transmits an electronic mail to a specific communication partner has an electronic mail address (referred to as an "unauthorized electronic mail address" in the present embodiment) other than an electronic mail address (referred to as an "authorized electronic mail address" in the present embodiment) registered in a white list relating to this specific communication partner. Thus, a case of this transmitter using this unauthorized electronic mail address to transmit an electronic mail to this specific communication partner is also assumed. In this case, the unauthorized electronic mail address of this transmitter is not registered in a white list relating to this specific communication partner. Thus, this electronic mail is not distributed to this specific communication partner, although it is desired that this specific communication partner should receive this mail.

However, it is evident that such a problem is resolved by the management server employing a configuration of storing all electronic mail addresses (electronic mail addresses including authorized electronic mail addresses and unauthorized electronic mail addresses) assigned to the subscribers on a subscriber by subscriber basis.

That is, first, when the server device has received an electronic mail transmitted using an unauthorized electronic mail address from the above transmitter to the above specific communication partner, this device transmits an unauthorized mail address to the management server. The management server makes a search for another electronic mail address assigned to the above transmitter, and then, transmits the searched address to the server device while the unauthorized electronic mail address is defined as a search key. The server device actually distributes the electronic mail to the above specific communication partner as long as the electronic mail address received from the management server is registered in the white list relating to the above specific communication partner. In this manner, the problem described above is resolved. Of course, the server device can add the electronic mail address thus received from the management server to the white list relating to the above specific communication partner.

While the present embodiment has described a case in which a server device communicates an electronic mail address or the like from a management server via a communication network, the present invention can also be applied to a case in which a server device is internally equipped with a management server.

Embodiment 6

A description will be given with respect to a sixth embodiment that corresponds to a case in which there exists a transmitter whose electronic mail address or telephone number is unauthorized.

When a white list management section 1106 judges in advance the presence or absence of a transmitter whose electronic mail address or telephone number is unauthorized in a white list, in the case where such a transmitter (unauthorized person) exists, this management section acquires a telephone number (electronic mail address) of this unauthorized person from the management server while an authorized electronic mail address (telephone number) is defined as a search key. Then, as a telephone number (electronic mail address) of this unauthorized person, the white list management section 1106 registers in the white list the telephone number (electronic mail address) acquired from the management server.

Figure 11:
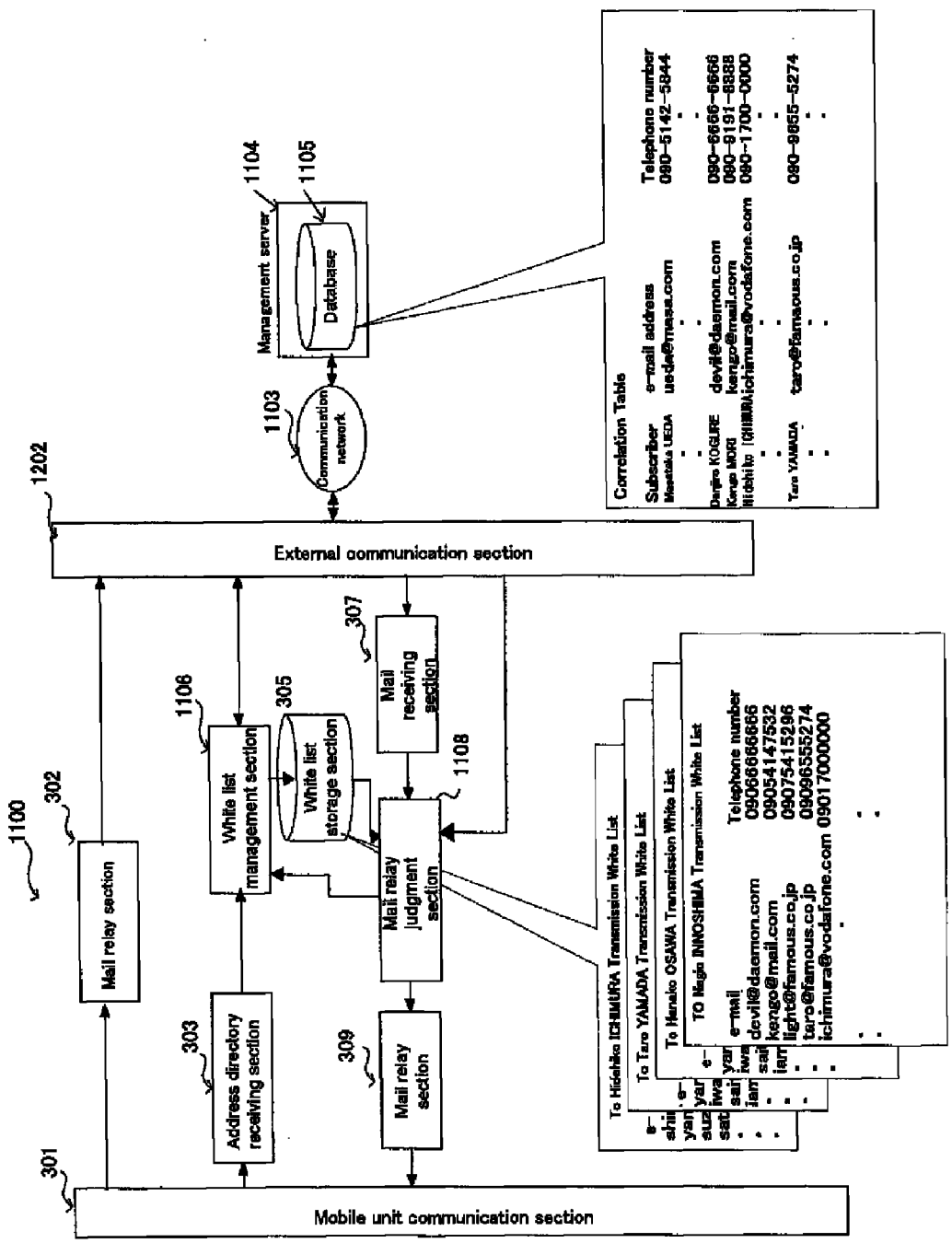
FIG. 11 is a block diagram of the fifth embodiment of the present invention.
Figure 12:
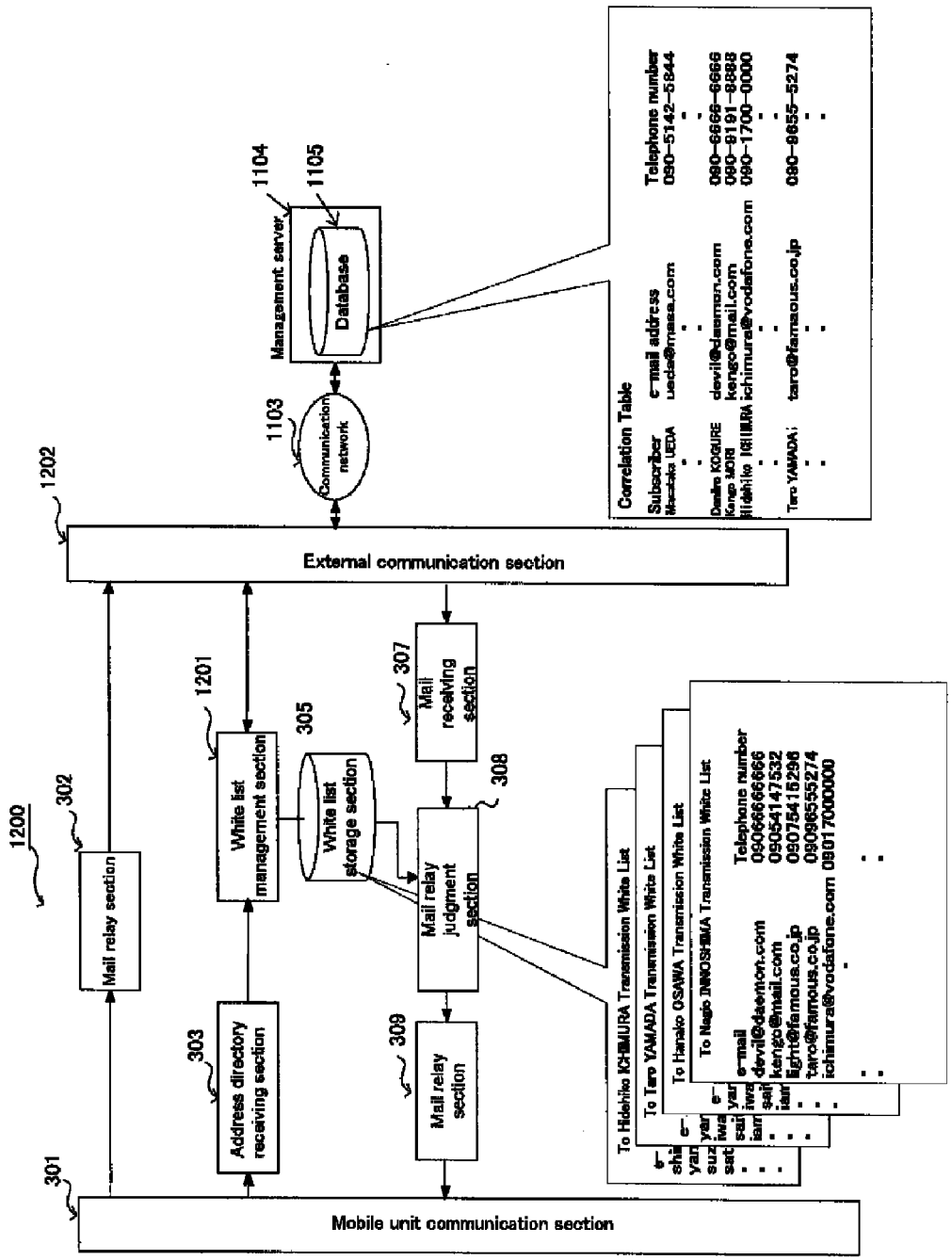
FIG. 12 is a block diagram of a sixth embodiment of the present invention.

In order to provide such a method, for example, as is the case with a mail relay judgment section 1101 shown in FIG. 11, the white list management section 304 in FIG. 1 may acquire the electronic mail address (telephone number) of this unauthorized person from a management server 1104 via an external communication section 1102 while the telephone number (electronic mail address) of the unauthorized person is acquired as a search key (FIG. 12).

With the server device according to the present embodiment, at the time of an actual electronic mail (short message) distributing operation by a mail relay judgment section, the number of transmitters whose electronic mail address or telephone number is unauthorized decreases in a white list. Thus, the electronic mail (short message) distributing operation can be executed efficiently as compared with the server device according to the fifth embodiment.

Embodiment 7

In a state in which address directory information including telephone numbers or electronic mail address and the like, of communication partners is registered in a mobile communication terminal device, in the case where this mobile communication terminal device fails or is lost, a user needs to register address directory information again in a new mobile communication terminal device.

On the other hand, an SIM card having user's information or the like stored therein is inserted into a desired mobile communication terminal device, whereby this user can make mobile communication using this mobile communication terminal device without making specific contract with a communication business entity. In this manner, the user can use a plurality of mobile communication terminal devices by using this SIM card.

In such a situation, for example, after the user has registered address directory information including telephone numbers or electronic mail addresses and the like, of communication partners in a first mobile communication terminal device having the SIM card inserted therein, when an attempt is made to utilize another mobile communication terminal device (second mobile communication terminal device), the user removes the SIM card from the first mobile communication terminal device, and then, inserts the removed card into the second mobile communication terminal device. At this time, the address directory information registered in the first mobile communication terminal device is not registered in the second mobile communication terminal device. Thus, the user needs to register address directory information again in the second mobile communication terminal device or needs to register in the second mobile communication terminal device the address directory information registered in the first mobile communication terminal device by using a medium capable of recording the address directory information.

Figure 13:
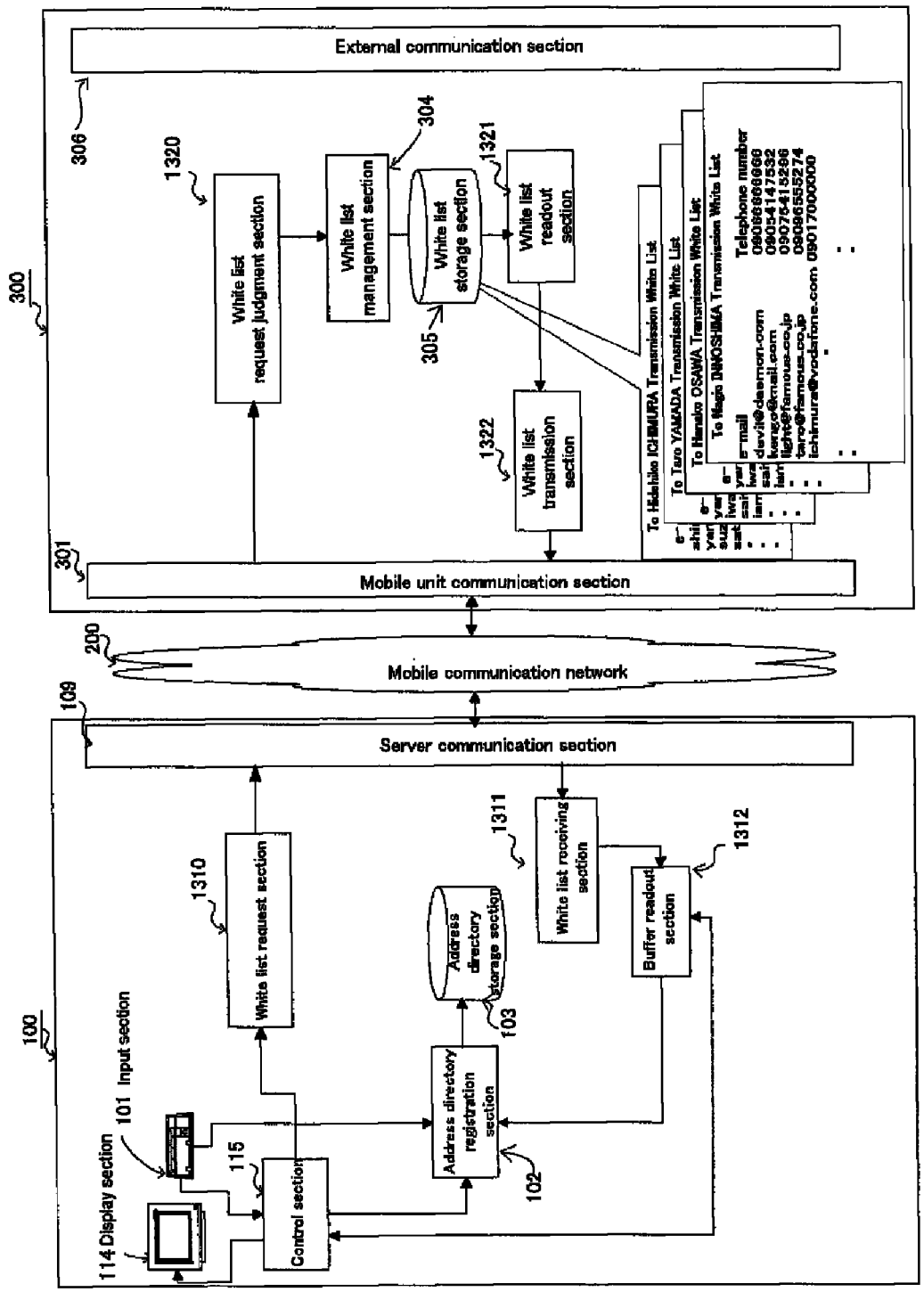
FIG. 13 is a block diagram of a seventh embodiment of the present invention.

In FIG. 13, there is shown a configuration of reading out the contents of a white list recorded to support a user in a white list storage section 305 of a server device 300, based on an e-mail address or a telephone number assigned to a mobile communication terminal device 100 having requested readout of the contents of the white list; transmitting the readout contents to a mobile communication terminal device 100 serving as a request source; and then, storing in one's own address directory storage section 103 a white list that has been transmitted in the mobile communication terminal device 100. In the figure, there have been extracted constituent elements associated with an operation of transferring a white list of a server device to an address directory storage section of the mobile communication terminal device, and then, storing in an address directory storage section the white list that has been transmitted by the mobile communication terminal device. The configuration shown in the figure can also be utilized solely, whereas it may be used together with the configurations shown as the first to sixth embodiments.

When a user of the mobile communication terminal device 100 requests transfer of a white list from an e-mail server 300, the user operates a predetermined button of the terminal device, and then, outputs a request for transferring the white list from a white list request section 1310 to the e-mail server via a control section 115. Upon the request for transferring the white list outputted from the mobile communication terminal device 100, there are included a command indicating that the white list transfer request occurs and at least one of a telephone number and an e-mail address of the mobile communication terminal device 100. The white list transfer request outputted from the white list request section 1310 is transmitted to a mobile unit communication section 301 of the e-mail server 300 via a server communication section 109 and a mobile communication network 200. The requests received by the mobile unit communication section 301 each are sent to a command judgment section. If it is judged that the command received by a white list request judgment section 1320 in the judgment section is a white list transfer request, the telephone number or mail address set for the command is transferred to a white list management section 304 together with the white list transfer request.

If it is judged that the white list transfer request is destined from the transferred telephone number or mail address to "Nagio INNOSHIMA", for example, the corresponding data is read out from a white list storage section 305 by means of a white list readout section 1321, and then, the read out data is transferred to a white list transmission section 1322. The white list transmission section 1322 converts the white list to a predetermined transmission format, and then, transmits the converted white list to a server communication section 109 of the mobile communication terminal device 100 via the mobile unit communication unit 301 and a mobile communication network 200. After a white list receiving section 1311 has received the white list from the server communication section 109, information on mail addresses included in the white list is extracted on a one by one item basis, the extracted information is converted into a format suitable for an address directory of the mobile communication terminal device, and then, the converted information is stored in a buffer.

A control section 115 of the mobile communication terminal device 100 controls a display section 114 to display that white list receiving completes, enabling storage into an address directory. By the display, a user instructs storage into the address directory. The storage into the address directory can be carried out in accordance with a method for storing all the e-mail addresses in batch or while the user instructs whether or not to display and store the e-mail addresses on one by one item basis.

In the present embodiment, as in the first to sixth embodiments described above, a server device transmits to a mobile communication terminal device via a communication network 200 the address directory information (for example, information including telephone numbers or electronic mail addresses of communication partners) that has been received by the mobile communication terminal device, the information having been registered in a white list storage section. In this manner, after registering the address directory information in the mobile communication terminal device, the user transmits the registered address directory information to the server device, whereby, in the case where this mobile communication terminal device fails or is lost, or alternatively, in the case where an SIM card has been inserted into a new mobile communication terminal device, the new mobile communication terminal device can receive the address directory information from the server device and register it.

In the server device according to the fifth embodiment or sixth embodiment described above, in the case where there exists a receiver whose electronic mail address or telephone number is not registered in a white list, as described above, it is possible to acquire this unauthorized electronic mail address or telephone number from a management server, and then, register the acquired address and telephone number in the white list (hereinafter, referred to as "white list compensation").

However, there is a problem that the server device unconditionally transmits to the mobile communication terminal device the address directory information included in such compensated white list. A specific example of this problem will be described with reference to FIG. 10.

Figure 10:
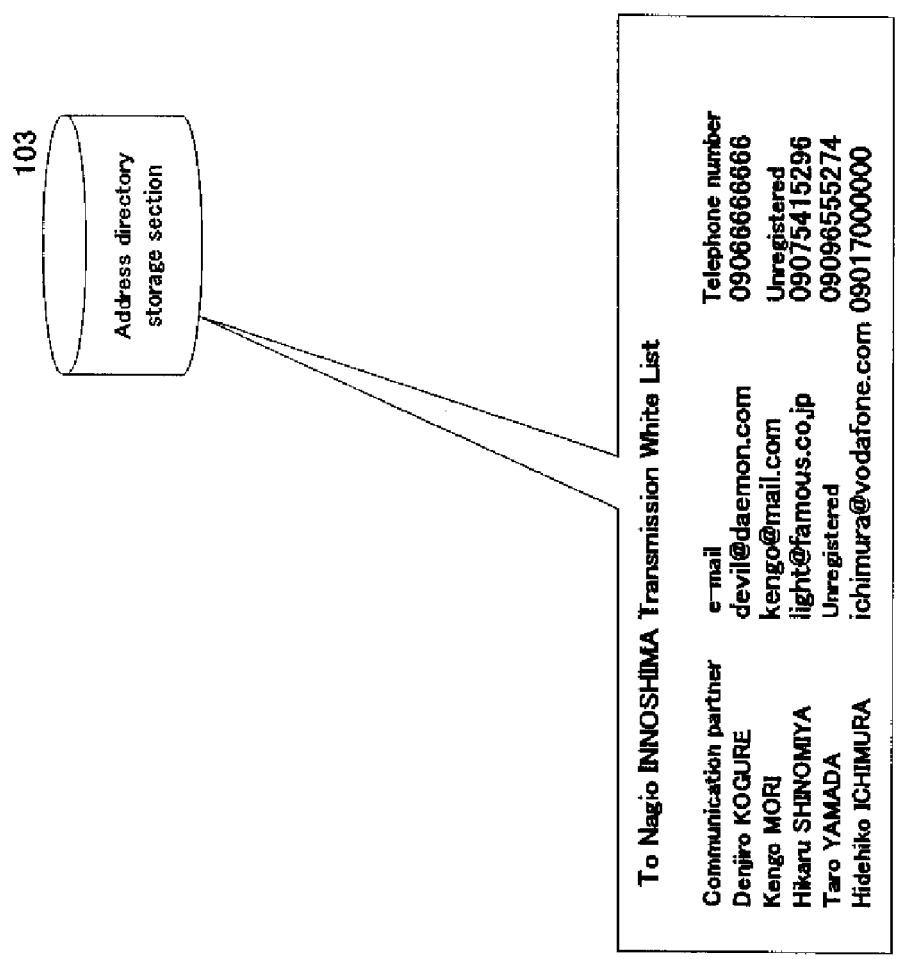
FIG. 10 is a diagram showing a configuration of a white list according to a fifth embodiment of the present invention.

Assume that all of the electronic mail addresses and telephone numbers of transmitters registered in a white list relating to "Nagio INNOSHIMA" shown in FIG. 10 are registered in a mobile communication terminal device of "Nagio INNOSHIMA". Therefore, even if the server device unconditionally transmits the address directory information (such as electronic mail address) included in this white list to the mobile communication terminal device of "Nagio INNOSHIMA", no problem occurs.

Here, assume that the server device acquires an electronic mail address of a receiver "Taro YAMADA" from the management server, and then, registers the acquired mail address in a white list. While the telephone number (090-9655-5274) of the receiver "Taro YAMADA" is essentially information registered in the mobile communication terminal device of "Nagio INNOSHIMA", the electronic mail address of "Taro YAMADA" is information that is not registered in the mobile communication terminal device of "Nagio INNOSHIMA", the information being principally known by only a communication business entity obliged to protect privacy information (such as electronic mail addresses or telephone numbers) of all users. Therefore, when the server device transmits the thus compensated address directory information intact to the mobile communication terminal device of "Nagio INNOSHIMA", the electronic mail address that is privacy information on "Taro YAMADA" is known to "Nagio INNOSHIMA" without any approval from "Taro YAMADA".

Therefore, in the present embodiment, the server device transmits to the mobile communication terminal device only address directory information excluding the compensated electronic mail addresses or telephone numbers. In order to achieve this, for example, when the server device registers in a white list the electronic mail address or telephone number acquired from the management server, information corresponding to "whether or not the compensated electronic mail address or telephone number occurs" is written into flags corresponding to these electronic mail addresses or telephone numbers. In the case where there has occurred a request for transmitting address directory information from the mobile communication terminal device, it is possible to transmit to the mobile communication terminal device only the electronic mail address or telephone number that has not been compensated yet, by referring to the contents of these flags or the like.

Privacy information is protected by employing the following configuration instead of the configuration of the server device transmitting to the mobile communication terminal device only the address directory information excluding the compensated electronic mail addresses or the like. That is, it is possible to employ a configuration of the server device transmitting to the mobile communication terminal device the information (such as flags) indicating which electronic mail address or the like has been acquired from the management server among the electronic mail addresses or the like included in address directory information together with all of the address directory information including the compensated electronic mail addresses or the like, the mobile communication terminal device making available (displayable) to a user only exclusion of the compensated electronic mail addresses or the like among the electronic mail addresses or the like included in address directory information, based on this information.

INDUSTRIAL APPLICABILITY

It becomes possible to eliminate a work of inputting mail address data for the purpose of updating a white list by utilizing information electronically stored in an address directory with respect to registration in an e-mail server's white list, of a transmission mail address allowed for transmission to the mobile communication terminal device. As a result, the latest data free of an input error can be reliably registered as a white list. In addition, the data stored in the e-mail server's white list is transferred to a mobile terminal device, thereby making it easy to update an address directory due to a device model change.

The invention claimed is:

1. A server device for distributing an e-mail via a communication line to a mobile communication terminal device of a user, said server device comprising:
   a receiving device that receives from the mobile communication terminal device an address directory having stored therein communication partner information that includes an e-mail address of a communication partner and another communication identifier of the communication partner that is different from the e-mail address of the communication partner, wherein the e-mail address of the communication partner is different from an e-mail address of the user of the mobile communication terminal device;
   a register device that registers in a list the communication partner information stored in the address directory received by the receiving device; and
   a distribution device that performs identification processing on an e-mail received from a transmitter for distribution to the mobile communication terminal device, wherein the e-mail includes content text data, wherein the identification processing includes the distribution device determining an e-mail address of the transmitter,
   wherein if the e-mail address of the transmitter of the e-mail is included in the list, the distribution device distributes the e-mail to the mobile communication terminal device, and
   wherein if the e-mail address of the transmitter of the e-mail is not included in the list, the distribution device further performs the following: determines, independently of the content text data of the e-mail, a different communication identifier of the transmitter of the e-mail, determines whether the different communication identifier of the transmitter is included in the list, and, if the different communication identifier of the transmitter is included in the list, distributes the e-mail to the mobile communication terminal device.

2. The server device of claim 1, wherein, in the case where a change has been made with an address directory of the mobile communication terminal device, the receiving device receives from the mobile communication terminal device an address directory from which a change has been made.

3. The server device of claim 2, wherein, in the case where a change has occurred with a communication network used for mail communication, the receiving device receives an address directory from the mobile communication terminal device.

4. The server device of claim 2, wherein the register device is capable of making a search of a storage memory for storing an e-mail address assigned to a subscriber of a mobile communication service, and, in the case where another mail address of the communication partner is stored in the storage memory, said another mail address is registered in the list as one of the e-mail addresses of the communication partner.

5. The server device of claim 1, wherein, every time a predetermined time has elapsed, the receiving device receives an address directory from the mobile communication terminal device.

6. The server device of claim 5, wherein, in the case where a change has occurred with a communication network used for mail communication, the receiving device receives an address directory from the mobile communication terminal device.

7. The server device of claim 5, wherein the register device is capable of making a search of a storage memory that stores an e-mail address assigned to a subscriber of a mobile communication service, and, in the case where another mail address of the communication partner is stored in the storage memory, said another mail address is registered in the list as one of the e-mail addresses of the communication partner.

8. The server device of claim 1, wherein the receiving device receives an address directory from the mobile communication terminal device in accordance with an arbitrary timing.

9. The server device of claim 8, wherein, in the case where a change has occurred with a communication network used for mail communication, the receiving device receives an address directory from the mobile communication terminal device.

10. The server device of claim 8, wherein the register device is capable of making a search of a storage memory that stores an e-mail address assigned to a subscriber of a mobile communication service, and, in the case where another mail address of the communication partner is stored in the storage memory, said another mail address is registered in the list as one of the e-mail addresses of the communication partner.

11. The server device of claim 1, wherein, in the case where a change has occurred in a communication network used for mail communication, the receiving device receives an address directory from the mobile communication terminal device.

12. The server device of claim 11, wherein the register device is capable of making a search of a storage memory that stores an e-mail address assigned to a subscriber of a mobile communication service, and, in the case where another mail address of the communication partner is stored in the storage memory, said another mail address is registered in the list as one of the e-mail addresses of the communication partner.

13. The server device of claim 1, wherein, if the e-mail address of the transmitter in the e-mail to be distributed to the mobile communication terminal device is not included in the list, when another mail address of the transmitter is included in the list, the distribution device distributes the e-mail to the mobile communication terminal device.

14. The server device of claim 13, wherein the distribution device is capable of making a search of a storage memory for storing an e-mail address assigned to a subscriber of a mobile communication service, and another mail address of the transmitter is acquired by making a search of the storage memory, based on the e-mail address of the transmitter in the e-mail to be distributed to the mobile communication terminal device.

15. The server device of claim 13, wherein the register device registers in the list another e-mail address of the transmitter in the e-mail.

16. The server device of claim 13, wherein the register device is capable of making a search of a storage memory that stores an e-mail address assigned to a subscriber of a mobile communication service, and, in the case where another mail address of the communication partner is stored in the storage memory, said another mail address is registered in the list as one of the e-mail addresses of the communication partner.

17. The server device of claim 1, wherein the register device is capable of making a search of a storage memory that stores an e-mail address assigned to a subscriber of a mobile communication service, and, in the case where another mail address of the communication partner is stored in the storage memory, said another mail address is registered in the list as one of the e-mail addresses of the communication partner.

18. The server device of claim 17, further comprising:
a transmission device that transmits the e-mail address registered in the list to the mobile communication terminal device.

19. The server device of claim 18, wherein information indicating which of the e-mail addresses registered in the list is an e-mail address acquired from the storage memory is transmitted to the mobile communication terminal device.

20. The server device of claim 17, further comprising:
a transmission device that transmits to the mobile communication terminal device mail addresses excluding the e-mail address acquired from the storage memory among the e-mail addresses registered in the list.

21. The server device of claim 1, wherein the other communication identifier of the communication partner is a telephone number of the communication partner.

22. The server device of claim 1, wherein the other communication identifier of the communication partner is another e-mail address of the communication partner.

23. A method for a server device to distribute an e-mail via a communication line to a mobile communication terminal device of a user, said method comprising the steps of
a server device receiving from the mobile communication terminal device an address directory having stored therein communication partner information that includes an e-mail address of a communication partner and another communication identifier of the communication partner that is different from the e-mail address of the communication partner, and then, registering in a list the communication partner information stored in the address directory, wherein the e-mail address of the communication partner is different from an e-mail address of the user of the mobile communication terminal device;
the server device performing identification processing on an e-mail received from a transmitter for distribution the mobile communication terminal device, wherein the e-mail includes content text data, wherein the identification processing includes the server device determining an e-mail address of the transmitter of the e-mail,
wherein, if the e-mail address of the transmitter of the e-mail is included in the list, the server device distributes the e-mail to the mobile communication terminal device, and
wherein, if the e-mail address of the transmitter of the e-mail is not included in the list, the server device further performs the following: determines, independently of the content text data of the e-mail, a different communication identifier of the transmitter of the e-mail, determines whether the different communication identifier of the transmitter is included in the list, and, if the different communication identifier of the transmitter is included in the list, distributes the e-mail to the mobile communication terminal device.

24. The method of claim 23, wherein the other communication identifier of the communication partner is a telephone number of the communication partner.

25. The method of claim 23, wherein the other communication identifier of the communication partner is another e-mail address of the communication partner.

* * * * *